(12) United States Patent
Davis

(10) Patent No.: US 8,194,666 B2
(45) Date of Patent: Jun. 5, 2012

(54) FLEXIBLE METHOD FOR PROCESSING DATA PACKETS IN A NETWORK ROUTING SYSTEM FOR ENHANCED EFFICIENCY AND MONITORING CAPABILITY

(75) Inventor: Ian Edward Davis, Fremont, CA (US)

(73) Assignee: Foundry Networks, LLC, San Jose, CA (US)

( * ) Notice: Subject to any disclaimer, the term of this patent is extended or adjusted under 35 U.S.C. 154(b) by 142 days.

(21) Appl. No.: 11/668,322

(22) Filed: Jan. 29, 2007

(65) Prior Publication Data

US 2009/0279546 A1 Nov. 12, 2009

Related U.S. Application Data

(62) Division of application No. 10/140,752, filed on May 6, 2002, now Pat. No. 7,468,975.

(51) Int. Cl.
*H04L 12/56* (2006.01)
(52) U.S. Cl. .................... 370/392; 370/400; 709/238
(58) Field of Classification Search ................. None
See application file for complete search history.

(56) References Cited

U.S. PATENT DOCUMENTS

| | | |
|---|---|---|
| 3,866,175 A | 2/1975 | Seifert, Jr. et al. |
| 4,325,119 A | 4/1982 | Grandmaison et al. |
| 4,348,725 A | 9/1982 | Farrell et al. |
| 4,628,480 A | 12/1986 | Floyd |
| 4,667,323 A | 5/1987 | Engdahl et al. |
| 4,683,564 A | 7/1987 | Young et al. ............... 370/63 |
| 4,698,748 A | 10/1987 | Juzswik et al. |
| 4,723,243 A | 2/1988 | Joshi et al. |

(Continued)

FOREIGN PATENT DOCUMENTS

EP 1380127 A2 1/2004

(Continued)

OTHER PUBLICATIONS

U.S. Appl. No. 09/855,015, filed May 15, 2001, Chang et al.

(Continued)

*Primary Examiner* — Brian Roberts
(74) *Attorney, Agent, or Firm* — Kilpatrick Townsend & Stockton LLP

(57) ABSTRACT

According to an embodiment of the invention, a network device such as a router or switch provides efficient data packet handling capability. The network device includes one or more input ports for receiving data packets to be routed, as well as one or more output ports for transmitting data packets. The network device includes an integrated port controller integrated circuit for routing packets. The integrated circuit includes an interface circuit, a received packets circuit, a buffer manager circuit for receiving data packets from the received packets circuit and transmitting data packets in one or more buffers and reading data packets from the one or more buffers. The integrated circuit also includes a rate shaper counter for storing credit for a traffic class, so that the integrated circuit can support input and/or output rate shaping. The integrated circuit may be associated with an IRAM, a CAM, a parameter memory configured to hold routing and/or switching parameters, which may be implemented as a PRAM, and an aging RAM, which stores aging information. The aging information may be used by a CPU coupled to the integrated circuit via a system interface circuit to remove entries from the CAM and/or the PRAM when an age count exceeds an age limit threshold for the entries.

8 Claims, 9 Drawing Sheets

U.S. PATENT DOCUMENTS

| | | | |
|---|---|---|---|
| 4,754,482 A | 6/1988 | Weiss | |
| 4,791,629 A | 12/1988 | Burns et al. | 370/85 |
| 4,794,629 A | 12/1988 | Pastyr et al. | |
| 4,807,280 A | 2/1989 | Posner et al. | 379/272 |
| 4,876,681 A | 10/1989 | Hagiwara et al. | 370/60 |
| 4,896,277 A | 1/1990 | Vercellotti et al. | |
| 4,985,889 A | 1/1991 | Frankish et al. | 370/94.1 |
| 5,101,404 A | 3/1992 | Kunimoto et al. | 370/60 |
| 5,136,584 A | 8/1992 | Hedlund | |
| 5,195,181 A | 3/1993 | Bryant et al. | |
| 5,208,856 A | 5/1993 | Leduc et al. | |
| 5,224,108 A | 6/1993 | McDysan et al. | |
| 5,231,633 A | 7/1993 | Hluchyj et al. | |
| 5,280,582 A | 1/1994 | Yang et al. | |
| 5,282,196 A | 1/1994 | Clebowicz | |
| 5,287,477 A | 2/1994 | Johnson et al. | |
| 5,299,190 A | 3/1994 | LaMaire et al. | |
| 5,299,195 A | 3/1994 | Shah | |
| 5,301,192 A | 4/1994 | Henrion | 370/94.1 |
| 5,307,345 A | 4/1994 | Lozowick et al. | 370/61 |
| 5,323,386 A | 6/1994 | Wiher et al. | 370/389 |
| 5,365,512 A | 11/1994 | Combs et al. | 370/16 |
| 5,377,189 A | 12/1994 | Clark | |
| 5,390,173 A | 2/1995 | Spinney et al. | 370/60 |
| 5,392,279 A | 2/1995 | Taniguchi | |
| 5,406,643 A | 4/1995 | Burke et al. | |
| 5,408,469 A | 4/1995 | Opher et al. | 370/60 |
| 5,430,442 A | 7/1995 | Kaiser et al. | 340/825.79 |
| 5,436,893 A | 7/1995 | Barnett | 370/60.1 |
| 5,461,615 A | 10/1995 | Henrion | 370/60.1 |
| 5,490,258 A | 2/1996 | Fenner | |
| 5,506,840 A | 4/1996 | Pauwels et al. | 370/60.1 |
| 5,506,841 A | 4/1996 | Sandquist | |
| 5,521,923 A | 5/1996 | Willmann et al. | 370/94.1 |
| 5,546,385 A | 8/1996 | Caspi et al. | 370/58.2 |
| 5,550,816 A | 8/1996 | Hardwick et al. | |
| 5,563,948 A | 10/1996 | Diehl et al. | |
| 5,566,170 A | 10/1996 | Bakke et al. | |
| 5,598,410 A | 1/1997 | Stone | 370/469 |
| 5,600,795 A | 2/1997 | Du | 395/200.02 |
| 5,619,497 A | 4/1997 | Gallagher et al. | 370/394 |
| 5,640,504 A | 6/1997 | Johnson, Jr. | 714/4 |
| 5,646,878 A | 7/1997 | Samra | |
| 5,663,952 A | 9/1997 | Gentry, Jr. | |
| 5,663,959 A | 9/1997 | Nakagawa et al. | 370/395 |
| 5,666,353 A | 9/1997 | Klausmeier et al. | 370/230 |
| 5,721,819 A | 2/1998 | Galles et al. | |
| 5,732,080 A | 3/1998 | Ferguson et al. | 370/392 |
| 5,734,826 A | 3/1998 | Olnowich et al. | |
| 5,740,176 A | 4/1998 | Gupta et al. | |
| 5,745,708 A | 4/1998 | Weppler et al. | |
| 5,751,710 A | 5/1998 | Crowther et al. | |
| 5,802,287 A | 9/1998 | Rostoker et al. | |
| 5,815,146 A | 9/1998 | Youden et al. | 345/327 |
| 5,818,816 A | 10/1998 | Chikazawa et al. | |
| 5,835,496 A | 11/1998 | Yeung et al. | 370/514 |
| 5,838,684 A | 11/1998 | Wicki et al. | 370/416 |
| 5,862,350 A | 1/1999 | Coulson | 395/283 |
| 5,864,555 A | 1/1999 | Mathur et al. | |
| 5,867,675 A | 2/1999 | Lomelino et al. | 395/309 |
| 5,870,538 A | 2/1999 | Manning et al. | 395/183.18 |
| 5,872,769 A | 2/1999 | Caldara et al. | |
| 5,872,783 A | 2/1999 | Chin | 370/392 |
| 5,875,200 A | 2/1999 | Glover et al. | |
| 5,896,380 A | 4/1999 | Brown et al. | |
| 5,907,566 A | 5/1999 | Benson et al. | 371/47.1 |
| 5,907,660 A | 5/1999 | Inoue et al. | 386/109 |
| 5,909,686 A | 6/1999 | Muller et al. | 707/104 |
| 5,915,094 A | 6/1999 | Kouloheris et al. | 395/200.49 |
| 5,920,566 A | 7/1999 | Hendel et al. | |
| 5,920,886 A | 7/1999 | Feldmeier | |
| 5,936,939 A | 8/1999 | Des Jardins et al. | 370/229 |
| 5,936,966 A | 8/1999 | Ogawa et al. | |
| 5,956,347 A | 9/1999 | Slater | |
| 5,999,528 A | 12/1999 | Chow et al. | 370/365 |
| 6,000,016 A | 12/1999 | Curtis et al. | |
| 6,011,910 A | 1/2000 | Chau et al. | |
| 6,016,310 A * | 1/2000 | Muller et al. | 370/255 |
| 6,023,471 A | 2/2000 | Haddock et al. | 370/426 |
| 6,031,843 A | 2/2000 | Swanbery et al. | |
| 6,035,414 A | 3/2000 | Okazawa et al. | 714/7 |
| 6,038,288 A | 3/2000 | Thomas et al. | 379/15 |
| 6,067,298 A | 5/2000 | Shinohara | |
| 6,067,606 A | 5/2000 | Holscher et al. | |
| 6,076,115 A | 6/2000 | Sambamurthy et al. | 709/250 |
| 6,081,522 A | 6/2000 | Hendel et al. | |
| 6,088,356 A | 7/2000 | Hendel et al. | 370/392 |
| 6,094,434 A | 7/2000 | Kotzur et al. | 370/401 |
| 6,104,696 A * | 8/2000 | Kadambi et al. | 370/218 |
| 6,104,700 A | 8/2000 | Haddock et al. | |
| 6,108,306 A | 8/2000 | Kalkunte et al. | |
| 6,118,787 A | 9/2000 | Kalkunte et al. | 370/445 |
| 6,125,417 A | 9/2000 | Bailis et al. | 710/103 |
| 6,128,666 A | 10/2000 | Muller et al. | |
| 6,144,668 A | 11/2000 | Bass et al. | 370/401 |
| 6,147,996 A | 11/2000 | Laor et al. | |
| 6,151,301 A | 11/2000 | Holden | 370/232 |
| 6,151,497 A | 11/2000 | Yee et al. | |
| 6,151,797 A | 11/2000 | Fleissner | |
| 6,154,446 A | 11/2000 | Kadambi et al. | 370/239 |
| 6,157,643 A | 12/2000 | Ma | 370/389 |
| 6,160,809 A | 12/2000 | Adiletta et al. | 370/392 |
| 6,160,812 A | 12/2000 | Bauman et al. | |
| 6,172,990 B1 | 1/2001 | Deb et al. | 370/474 |
| 6,178,520 B1 | 1/2001 | DeKoning et al. | |
| 6,181,699 B1 | 1/2001 | Crinion et al. | |
| 6,185,222 B1 | 2/2001 | Hughes | |
| 6,195,335 B1 | 2/2001 | Calvignac et al. | |
| 6,201,492 B1 | 3/2001 | Amar et al. | |
| 6,222,845 B1 | 4/2001 | Shue et al. | 370/400 |
| 6,243,667 B1 | 6/2001 | Kerr et al. | 703/27 |
| 6,249,528 B1 | 6/2001 | Kothary | |
| 6,263,374 B1 | 7/2001 | Olnowich et al. | |
| 6,272,144 B1 | 8/2001 | Berenbaum et al. | 370/419 |
| 6,304,903 B1 | 10/2001 | Ward | |
| 6,320,859 B1 | 11/2001 | Momirov | 370/395 |
| 6,333,929 B1 | 12/2001 | Drottar et al. | 370/362 |
| 6,335,932 B2 | 1/2002 | Kadambi et al. | 370/391 |
| 6,335,935 B2 | 1/2002 | Kadambi et al. | 370/391 |
| 6,343,072 B1 | 1/2002 | Bechtolsheim et al. | 370/351 |
| 6,351,143 B1 | 2/2002 | Guccione et al. | |
| 6,356,550 B1 | 3/2002 | Williams | 370/364 |
| 6,356,942 B1 | 3/2002 | Bengtsson et al. | 709/220 |
| 6,359,879 B1 | 3/2002 | Carvey et al. | |
| 6,363,077 B1 * | 3/2002 | Wong et al. | 370/422 |
| 6,366,557 B1 | 4/2002 | Hunter | |
| 6,369,855 B1 | 4/2002 | Chauvel et al. | 348/423.1 |
| 6,421,352 B1 | 7/2002 | Manaka et al. | |
| 6,424,658 B1 | 7/2002 | Mathur | 370/429 |
| 6,424,659 B2 | 7/2002 | Viswanadham et al. | 370/469 |
| 6,427,185 B1 | 7/2002 | Ryals et al. | |
| 6,430,190 B1 | 8/2002 | Essbaum et al. | |
| 6,457,175 B1 | 9/2002 | Lerche | |
| 6,459,705 B1 | 10/2002 | Cheng | |
| 6,460,088 B1 * | 10/2002 | Merchant | 709/236 |
| 6,463,063 B1 | 10/2002 | Bianchini, Jr. et al. | |
| 6,466,608 B1 | 10/2002 | Hong et al. | |
| 6,470,436 B1 | 10/2002 | Croft et al. | |
| 6,473,428 B1 | 10/2002 | Nichols et al. | |
| 6,473,433 B1 | 10/2002 | Bianchini, Jr. et al. | |
| 6,477,174 B1 | 11/2002 | Dooley et al. | 370/416 |
| 6,480,477 B1 | 11/2002 | Treadaway et al. | |
| 6,490,280 B1 | 12/2002 | Leung | |
| 6,493,347 B2 | 12/2002 | Sindhu et al. | 370/401 |
| 6,496,502 B1 * | 12/2002 | Fite et al. | 370/389 |
| 6,505,281 B1 | 1/2003 | Sherry | |
| 6,510,138 B1 | 1/2003 | Pannell | |
| 6,522,656 B1 | 2/2003 | Gridley | |
| 6,532,229 B1 * | 3/2003 | Johnson et al. | 370/351 |
| 6,532,234 B1 | 3/2003 | Yoshikawa et al. | |
| 6,535,504 B1 * | 3/2003 | Johnson et al. | 370/351 |
| 6,549,519 B1 | 4/2003 | Michels et al. | |
| 6,553,370 B1 | 4/2003 | Andreev et al. | |
| 6,556,208 B1 | 4/2003 | Congdon et al. | |
| 6,567,404 B1 | 5/2003 | Wilford et al. | 370/389 |
| 6,570,884 B1 * | 5/2003 | Connery et al. | 370/419 |
| 6,577,631 B1 | 6/2003 | Keenan et al. | |

| | | |
|---|---|---|
| 6,587,432 B1 | 7/2003 | Putzolu et al. |
| 6,591,302 B2 | 7/2003 | Boucher et al. |
| 6,601,186 B1 | 7/2003 | Fox et al. |
| 6,606,300 B1 | 8/2003 | Blanc et al. ............... 370/229 |
| 6,628,650 B1 | 9/2003 | Saito et al. |
| 6,633,580 B1 | 10/2003 | Torudbakken et al. |
| 6,636,483 B1 | 10/2003 | Pannell |
| 6,643,269 B1 | 11/2003 | Fan et al. ................... 370/254 |
| 6,654,342 B1 | 11/2003 | Dittia et al. |
| 6,654,346 B1 | 11/2003 | Mahalingaiah et al. |
| 6,654,370 B1 | 11/2003 | Quirke et al. ................ 370/389 |
| 6,654,373 B1 | 11/2003 | Maher, III et al. |
| 6,658,002 B1 | 12/2003 | Ross et al. ................... 370/392 |
| 6,661,791 B1 | 12/2003 | Brown |
| 6,671,275 B1 | 12/2003 | Wong et al. .................. 370/389 |
| 6,678,248 B1 | 1/2004 | Haddock et al. |
| 6,681,332 B1 | 1/2004 | Byrne et al. .................. 713/300 |
| 6,683,872 B1 | 1/2004 | Saito |
| 6,687,217 B1 | 2/2004 | Chow et al. |
| 6,687,247 B1 | 2/2004 | Wilford et al. ............... 370/392 |
| 6,691,202 B2 | 2/2004 | Vasquez et al. .............. 710/316 |
| 6,696,917 B1 | 2/2004 | Heitner et al. ............... 340/2.22 |
| 6,697,359 B1 | 2/2004 | George ......................... 370/357 |
| 6,697,368 B2 | 2/2004 | Chang et al. ............... 370/395.1 |
| 6,700,894 B1 | 3/2004 | Shung .......................... 370/412 |
| 6,708,000 B1 | 3/2004 | Nishi et al. |
| 6,721,229 B1 | 4/2004 | Cole |
| 6,721,268 B1 | 4/2004 | Ohira et al. |
| 6,721,313 B1 | 4/2004 | Van Duyne .................. 370/386 |
| 6,721,338 B1 | 4/2004 | Sato |
| 6,731,875 B1 | 5/2004 | Kartalopoulos |
| 6,735,218 B2 | 5/2004 | Chang et al. ................. 370/471 |
| 6,745,277 B1 | 6/2004 | Lee et al. |
| 6,747,971 B1 | 6/2004 | Hughes et al. |
| 6,751,224 B1 | 6/2004 | Parruck et al. ............. 370/395.6 |
| 6,754,881 B2 | 6/2004 | Kuhlmann et al. ............. 716/16 |
| 6,765,866 B1 * | 7/2004 | Wyatt ............................ 370/229 |
| 6,775,706 B1 | 8/2004 | Fukumoto et al. ............ 709/230 |
| 6,778,546 B1 | 8/2004 | Epps et al. ..................... 370/413 |
| 6,781,990 B1 | 8/2004 | Puri et al. |
| 6,785,290 B1 | 8/2004 | Fujisawa et al. |
| 6,788,697 B1 | 9/2004 | Aweya et al. |
| 6,792,484 B1 | 9/2004 | Hook |
| 6,792,502 B1 | 9/2004 | Pandya et al. ................. 711/108 |
| 6,798,740 B1 | 9/2004 | Senevirathne et al. ....... 370/219 |
| 6,804,220 B2 | 10/2004 | Odenwalder et al. |
| 6,804,731 B1 | 10/2004 | Chang et al. ................... 710/53 |
| 6,807,179 B1 | 10/2004 | Kanuri et al. |
| 6,807,363 B1 | 10/2004 | Abiko et al. .................... 386/68 |
| 6,810,038 B1 | 10/2004 | Isoyama et al. |
| 6,810,046 B2 | 10/2004 | Abbas et al. |
| 6,813,243 B1 | 11/2004 | Epps et al. ..................... 370/235 |
| 6,813,266 B1 | 11/2004 | Chiang et al. |
| 6,816,467 B1 | 11/2004 | Muller et al. .................. 370/256 |
| 6,831,923 B1 | 12/2004 | Laor et al. ..................... 370/412 |
| 6,831,932 B1 | 12/2004 | Boyle et al. |
| 6,836,808 B2 | 12/2004 | Bunce et al. |
| 6,839,346 B1 | 1/2005 | Kametani ...................... 370/389 |
| 6,842,422 B1 | 1/2005 | Bianchini, Jr. ................ 370/216 |
| 6,854,117 B1 | 2/2005 | Roberts ......................... 718/102 |
| 6,856,600 B1 | 2/2005 | Russell et al. |
| 6,859,438 B2 | 2/2005 | Haddock et al. |
| 6,865,153 B1 | 3/2005 | Hill et al. ................... 370/230.1 |
| 6,901,072 B1 | 5/2005 | Wong ............................ 370/389 |
| 6,906,936 B1 | 6/2005 | James et al. |
| 6,912,637 B1 | 6/2005 | Herbst |
| 6,920,154 B1 | 7/2005 | Aschler |
| 6,925,516 B2 | 8/2005 | Struhsaker et al. ............ 710/301 |
| 6,934,305 B1 | 8/2005 | Duschatko et al. |
| 6,937,606 B2 | 8/2005 | Basso et al. .................... 370/412 |
| 6,946,948 B2 | 9/2005 | McCormack et al. |
| 6,957,258 B2 | 10/2005 | Maher, III et al. ............ 709/224 |
| 6,959,007 B1 | 10/2005 | Vogel et al. |
| 6,973,092 B1 | 12/2005 | Zhou et al. |
| 6,975,599 B1 | 12/2005 | Johnson et al. |
| 6,978,309 B1 | 12/2005 | Dorbolo |
| 6,980,552 B1 | 12/2005 | Belz et al. |
| 6,982,974 B1 | 1/2006 | Saleh et al. |
| 6,990,102 B1 | 1/2006 | Kaniz et al. |
| 6,993,032 B1 | 1/2006 | Dammann et al. |
| 6,996,663 B1 | 2/2006 | Marsteiner |
| 7,005,812 B2 | 2/2006 | Mitchell |
| 7,009,968 B2 | 3/2006 | Ambe et al. |
| 7,012,919 B1 | 3/2006 | So et al. |
| 7,050,430 B2 | 5/2006 | Kalkunte et al. |
| 7,080,238 B2 | 7/2006 | Van Hoof et al. |
| 7,082,133 B1 | 7/2006 | Lor et al. |
| 7,103,041 B1 | 9/2006 | Speiser et al. |
| 7,499,395 B2 | 9/2006 | Rahman et al. |
| 7,120,744 B2 | 10/2006 | Klein |
| 7,126,948 B2 | 10/2006 | Gooch et al. |
| 7,126,956 B2 | 10/2006 | Scholten |
| 7,161,948 B2 | 1/2007 | Sampath et al. |
| 7,167,471 B2 | 1/2007 | Calvignac et al. |
| 7,176,911 B1 | 2/2007 | Kidono et al. |
| 7,185,141 B1 | 2/2007 | James et al. |
| 7,185,266 B2 | 2/2007 | Blightman et al. |
| 7,187,687 B1 | 3/2007 | Davis et al. ................... 370/419 |
| 7,190,696 B1 | 3/2007 | Manur et al. |
| 7,191,277 B2 | 3/2007 | Broyles |
| 7,191,468 B2 | 3/2007 | Hanner |
| 7,203,194 B2 | 4/2007 | Chang et al. .................. 370/389 |
| 7,206,283 B2 | 4/2007 | Chang et al. .................. 370/230 |
| 7,212,536 B2 | 5/2007 | MacKiewich et al. |
| 7,218,637 B1 | 5/2007 | Best et al. |
| 7,219,293 B2 | 5/2007 | Tsai et al. |
| 7,228,509 B1 | 6/2007 | Dada et al. |
| 7,236,490 B2 | 6/2007 | Chang et al. |
| 7,237,058 B2 | 6/2007 | Srinivasan |
| 7,249,306 B2 | 7/2007 | Chen |
| 7,266,117 B1 | 9/2007 | Davis |
| 7,272,611 B1 | 9/2007 | Cuppett et al. |
| 7,272,613 B2 | 9/2007 | Sim et al. |
| 7,277,425 B1 | 10/2007 | Sikdar |
| 7,283,547 B1 | 10/2007 | Hook et al. |
| 7,286,534 B2 | 10/2007 | Kloth |
| 7,324,509 B2 | 1/2008 | Ni |
| 7,355,970 B2 | 4/2008 | Lor |
| 7,356,030 B2 | 4/2008 | Chang et al. |
| 7,366,100 B2 | 4/2008 | Anderson et al. |
| 7,391,769 B2 | 6/2008 | Rajkumar et al. |
| 7,428,693 B2 | 9/2008 | Obuchi et al. |
| 7,512,127 B2 | 3/2009 | Chang et al. |
| 7,558,193 B2 | 7/2009 | Bradbury et al. |
| 7,561,590 B1 | 7/2009 | Walsh |
| 7,596,139 B2 | 9/2009 | Patel et al. |
| 7,609,617 B2 | 10/2009 | Appanna et al. |
| 7,613,991 B1 | 11/2009 | Bain |
| 7,636,369 B2 | 12/2009 | Wong |
| 7,649,885 B1 | 1/2010 | Davis |
| 7,657,703 B1 | 2/2010 | Singh |
| 7,738,450 B1 | 6/2010 | Davis |
| 7,813,367 B2 | 10/2010 | Wong |
| 7,817,659 B2 | 10/2010 | Wong |
| 7,830,884 B2 | 11/2010 | Davis |
| 7,903,654 B2 | 3/2011 | Bansal |
| 7,933,947 B2 | 4/2011 | Fleischer et al. |
| 7,948,872 B2 | 5/2011 | Patel et al. |
| 7,953,922 B2 | 5/2011 | Singh |
| 7,953,923 B2 | 5/2011 | Singh |
| 8,014,278 B1 | 9/2011 | Subramanian et al. |
| 8,037,399 B2 | 10/2011 | Wong et al. |
| 8,090,901 B2 | 1/2012 | Lin et al. |
| 2001/0001879 A1 | 5/2001 | Kubik et al. |
| 2001/0007560 A1 | 7/2001 | Masuda et al. |
| 2001/0026551 A1 | 10/2001 | Horlin |
| 2001/0048785 A1 | 12/2001 | Steinberg ........................ 385/20 |
| 2001/0053150 A1 | 12/2001 | Clear et al. .................... 370/392 |
| 2002/0001307 A1 | 1/2002 | Nguyen et al. |
| 2002/0040417 A1 | 4/2002 | Winograd et al. |
| 2002/0054594 A1 | 5/2002 | Hoof et al. ..................... 370/389 |
| 2002/0054595 A1 * | 5/2002 | Ambe et al. ................... 370/390 |
| 2002/0069294 A1 | 6/2002 | Herkersdorf et al. .......... 709/238 |
| 2002/0073073 A1 | 6/2002 | Cheng |
| 2002/0085499 A1 | 7/2002 | Toyoyama et al. |
| 2002/0087788 A1 | 7/2002 | Morris |
| 2002/0089937 A1 | 7/2002 | Venkatachary et al. |
| 2002/0089977 A1 | 7/2002 | Chang et al. .................. 370/386 |

| | | |
|---|---|---|
| 2002/0091844 A1 | 7/2002 | Craft et al. |
| 2002/0091884 A1 | 7/2002 | Chang et al. .................... 710/58 |
| 2002/0097713 A1 | 7/2002 | Chang et al. .................... 370/369 |
| 2002/0105966 A1 | 8/2002 | Patel et al. .................... 370/463 |
| 2002/0126672 A1 | 9/2002 | Chow et al. |
| 2002/0131437 A1* | 9/2002 | Tagore-Brage ............... 370/419 |
| 2002/0141403 A1 | 10/2002 | Akahane et al. |
| 2002/0146013 A1 | 10/2002 | Karlsson et al. |
| 2002/0161967 A1 | 10/2002 | Kirihata et al. |
| 2002/0169786 A1 | 11/2002 | Richek |
| 2002/0191605 A1 | 12/2002 | Van Lunteren et al. |
| 2003/0009466 A1 | 1/2003 | Ta et al. .................... 707/100 |
| 2003/0012198 A1 | 1/2003 | Kaganoi et al. |
| 2003/0033435 A1 | 2/2003 | Hanner .................... 709/247 |
| 2003/0043800 A1 | 3/2003 | Sonksen et al. ............... 370/389 |
| 2003/0043848 A1 | 3/2003 | Sonksen |
| 2003/0048785 A1 | 3/2003 | Calvignac et al. ............ 370/392 |
| 2003/0061459 A1 | 3/2003 | Aboulenein et al. |
| 2003/0074657 A1 | 4/2003 | Bramley, Jr. |
| 2003/0081608 A1 | 5/2003 | Barri et al. |
| 2003/0095548 A1 | 5/2003 | Yamano |
| 2003/0103499 A1 | 6/2003 | Davis et al. |
| 2003/0103500 A1 | 6/2003 | Menon et al. |
| 2003/0108052 A1 | 6/2003 | Inoue et al. |
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. .................... 370/395.21 |
| 2003/0152096 A1 | 8/2003 | Chapman |
| 2003/0156586 A1 | 8/2003 | Lee et al. |
| 2003/0159086 A1 | 8/2003 | Arndt |
| 2003/0165160 A1 | 9/2003 | Minami et al. |
| 2003/0169470 A1 | 9/2003 | Alagar et al. |
| 2003/0174719 A1 | 9/2003 | Srinivas et al. |
| 2003/0177221 A1 | 9/2003 | Ould-Brahim et al. |
| 2003/0198182 A1 | 10/2003 | Pegrum et al. |
| 2003/0200343 A1 | 10/2003 | Greenblat et al. |
| 2003/0214956 A1 | 11/2003 | Navada et al. |
| 2003/0215029 A1 | 11/2003 | Limberg .................... 375/321 |
| 2003/0223424 A1 | 12/2003 | Anderson et al. |
| 2003/0223466 A1 | 12/2003 | Noronha, Jr. et al. |
| 2003/0227943 A1 | 12/2003 | Hallman et al. |
| 2004/0022263 A1 | 2/2004 | Zhao et al. .................... 370/461 |
| 2004/0028060 A1 | 2/2004 | Kang |
| 2004/0054867 A1 | 3/2004 | Stravers et al. |
| 2004/0062245 A1 | 4/2004 | Sharp et al. |
| 2004/0062246 A1 | 4/2004 | Boucher et al. |
| 2004/0088469 A1 | 5/2004 | Levy |
| 2004/0128434 A1 | 7/2004 | Khanna et al. |
| 2004/0141504 A1 | 7/2004 | Blanc |
| 2004/0179548 A1 | 9/2004 | Chang et al. .................... 370/471 |
| 2004/0190547 A1 | 9/2004 | Gordy et al. |
| 2004/0208177 A1 | 10/2004 | Ogawa |
| 2004/0208181 A1 | 10/2004 | Clayton et al. |
| 2004/0223502 A1 | 11/2004 | Wybenga et al. |
| 2004/0235480 A1 | 11/2004 | Rezaaifar et al. |
| 2004/0264380 A1 | 12/2004 | Kalkunte et al. |
| 2005/0010630 A1 | 1/2005 | Doering et al. |
| 2005/0010849 A1 | 1/2005 | Lee et al. |
| 2004/0041684 A1 | 2/2005 | Reynolds et al. ............... 370/463 |
| 2005/0089049 A1 | 4/2005 | Chang et al. .................... 370/396 |
| 2005/0097432 A1 | 5/2005 | Obuchi et al. |
| 2005/0120122 A1 | 6/2005 | Farnham |
| 2005/0132132 A1 | 6/2005 | Rosenbluth et al. |
| 2005/0132179 A1 | 6/2005 | Glaum et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1 | 7/2005 | Lodha et al. |
| 2005/0169317 A1 | 8/2005 | Prueckelmayer |
| 2005/0175018 A1 | 8/2005 | Wong .................... 370/396 |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura |
| 2006/0050690 A1 | 3/2006 | Epps et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2007/0038798 A1 | 2/2007 | Bouchard et al. |
| 2007/0088974 A1 | 4/2007 | Chandwani et al. |
| 2007/0127464 A1 | 6/2007 | Jain et al. |
| 2007/0179909 A1 | 8/2007 | Channasagara |
| 2007/0208876 A1 | 9/2007 | Davis |
| 2007/0253420 A1 | 11/2007 | Chang et al. |
| 2007/0258475 A1 | 11/2007 | Chinn et al. |
| 2007/0288690 A1 | 12/2007 | Shingyu et al. |
| 2008/0002707 A1 | 1/2008 | Davis |
| 2008/0031263 A1 | 2/2008 | Ervin et al. |
| 2008/0037544 A1 | 2/2008 | Yano et al. |
| 2008/0049742 A1 | 2/2008 | Bansal |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0117075 A1 | 5/2008 | Seddigh et al. |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279548 A1 | 11/2009 | Davis et al. |
| 2009/0279549 A1 | 11/2009 | Ramanathan et al. |
| 2009/0279558 A1 | 11/2009 | Davis et al. |
| 2009/0279559 A1 | 11/2009 | Wong et al. |
| 2009/0279561 A1 | 11/2009 | Chang et al. |
| 2009/0282148 A1 | 11/2009 | Wong et al. |
| 2009/0282322 A1 | 11/2009 | Wong et al. |
| 2009/0287952 A1 | 11/2009 | Patel et al. |
| 2009/0290499 A1 | 11/2009 | Patel et al. |
| 2010/0034215 A1 | 2/2010 | Patel et al. |
| 2010/0046521 A1 | 2/2010 | Wong |
| 2010/0061393 A1 | 3/2010 | Wong |
| 2010/0100671 A1 | 4/2010 | Singh |
| 2010/0135313 A1 | 6/2010 | Davis |
| 2010/0161894 A1 | 6/2010 | Singh |
| 2010/0246588 A1 | 9/2010 | Davis |
| 2010/0293327 A1 | 11/2010 | Lin et al. |
| 2011/0002340 A1 | 1/2011 | Davis |
| 2011/0044340 A1 | 2/2011 | Bansal et al. |
| 2011/0110237 A1 | 5/2011 | Wong et al. |

FOREIGN PATENT DOCUMENTS

| | | |
|---|---|---|
| JP | 2003-289359 A | 10/2003 |
| JP | 2004-537871 T | 12/2004 |
| WO | WO 01/84728 A1 | 11/2001 |
| WO | WO 02/41544 A2 | 5/2007 |

OTHER PUBLICATIONS

U.S. Appl. No. 11/828,246, filed Jul. 25, 2007, Davis.
U.S. Appl. No. 11/779,778, filed Jul. 18, 2007, Wong et al.
U.S. Appl. No. 11/779,714, filed Jul. 18, 2007, Wong et al.
U.S. Appl. No. 11/621,038, filed Jan. 8, 2007, Davis et al.
U.S. Appl. No. 10/141,223, filed May 7, 2002, Veerabadran et al.
U.S. Appl. No. 10/810,208, filed Mar. 26, 2004, Wong et al.
U.S. Appl. No. 10/832,086, filed Apr. 26, 2004, Wong.
Belhadj et al., "Feasibility of a 100GE MAC", IEEE Meeting Nov. 2006, 18 pages.
Braun et al., "Fast incremental CRC updates for IP over ATM networks," IEEE Workshop on High Performance Switching and Routing, 2001, pp. 48-52.

International Search Report of Jun. 17, 2003 for application No. PCT/US03/08719.
Satran et al., "Out of Order Incremental CRC Computation," IEEE Transactions on Computers, vol. 54, Issue 9 Sep. 2005), pp. 1178-1181.
Spurgeon, C., "Ethernet, The Definitive Guide," O'Reilly & Associates, Inc., Sebastapol, CA, Feb. 2000.
ANSI/IEEE Standard 802.1D, 1998 Edition (373 pages).
U.S. Appl. No. 11/724,965.
U.S. Appl. No. 11/586,991, filed Oct. 25, 2006, Ramanathan.
U.S. Appl. No. 11/831,950, filed Jul. 31, 2007, Ravindran et al.
U.S. Appl. No. 11/118,697, filed Apr. 28, 2005, Singh.
U.S. Appl. No. 11/953,742, filed Dec. 10, 2007, Wong et al.
U.S. Appl. No. 11/953,743, filed Dec. 10, 2007, Wong et al.
U.S. Appl. No. 11/953,745, filed Dec. 10, 2007, Wong et al.
U.S. Appl. No. 11/953,751, filed Dec. 10, 2007, Wong et al.
Notice of Allowance for U.S. Appl. No. 09/988,066, Mailed Jan. 9, 2009, 13 pages.
Non-Final Office Action for U.S. Appl. No. 10/832,086, Mailed Apr. 1, 2009, 17 pages.
U.S. Appl. No. 12/400,594, filed Mar. 9, 2009, Patel et al.
U.S. Appl. No. 12/400,645, filed Mar. 9, 2009, Patel et al.
U.S. Appl. No. 12/372,390, filed Feb. 17, 2009, Chang et al.
U.S. Appl. No. 12/417,913, filed Apr. 3, 2009, Patel et al.
Final Office Action for U.S. Appl. No. 10/140,751, Mailed Mar. 17, 2009, 17 pages.
Non-Final Office Action for U.S. Appl. No. 11/615,769, Mailed Apr. 15, 2009, 11 pages.
Non-Final Office Action for U.S. Appl. No. 11/621,038, Mailed Apr. 23, 2009, 44 pages.
Non-Final Office Action for U.S. Appl. No. 11/745,008, Mailed May 14, 2009, 27 pages.
Non Final Office Action for U.S. Appl. No. 11/804,977, Mailed Jan. 14, 2008, 13 pages.
Notice of Allowance for U.S. Appl. No. 11/804,977, Mailed Nov. 19, 2008, 17 pages.
Newton, Newton's Telecom Dictionary, CMP Books, Mar. 2004, 20th Ed., p. 617.
International Preliminary Examination Report for Application No. PCT/US2001/043113, mailed Nov. 6, 2003, 6pages.
Written Opinion of the International Searching Authority for Application No. PCT/US2001/043113, mailed May 1, 2003, 6 pages.
International Search Report for Application No. PCT/US2001/043113, mailed Dec. 13, 2002, 2 pages.
Non-Final Office Action for U.S. Appl. No. 09/855,024. mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003. 6 pages.
Non-Final Office Action for U.S. Appl. No. 10/810,301, mailed Mar. 17, 2005,11 pages.
Non-Final Office Action for U.S. Appl. No. 10/810,301, mailed Feb. 16, 2006, 12 pages.
Notice of Allowance for U.S. Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 11/611,067, mailed Feb. 20, 2009, 11 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non-Final Office Action for U.S. Appl. No. 11/586,991, mailed Oct. 2, 2008, 23 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/854,486, mailed Jul. 20, 2009, 29 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.

Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Advisory Action for U.S. Appl. No. 10/140,751, mailed Jun. 1, 2009, 3 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appll. No. 10/139,831, mailed Jun. 26, 2007, 25 pages.
Non-Final Office Action for U.S. Appl. No. 11/828,246, mailed Jun. 15, 2009, 26 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Requirement for Restriction/Election for U.S. Appl. No. 11/118,697, mailed Jun. 2, 2009, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Application No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
U.S. Appl. No. 12/198,697, filed Aug. 26, 2008, Hsu et al.
U.S. Appl. No. 12/505,390, filed Jul. 17, 2009, Patel et al.
Final Office Action for U.S. Appl. No. 10/832,086, mailed on Sep. 29, 2009, 26 pages.
Non-Final Office Action for U.S. Appl. No. 11/831,950, mailed on Aug. 18, 2009, 49 pages.
Non-Final Office Action for U.S. Appl. No. 11/779,714, mailed on Sep. 1, 2009, 58 pages.
Non-Final Office Action for U.S. Appl. No. 10/810,208, mailed on Aug. 24, 2009, 38 pages.
Non-Final Office Action for U.S. Appl. No. 10/140,751, mailed on Sep. 28, 2009, 34 pages.
Notice of Allowance for U.S. Appl. No. 11/000,359, mailed on Sep. 22, 2009, 17 pages.
Notice of Allowance for U.S. Appl. No. 11/118,697, mailed on Sep. 30, 2009, 41 pages.
Non-Final Office Action for U.S. Appl. No. 11/953,742, mailed on Nov. 19, 2009, 51 pages.
Non-Final Office Action for U.S. Appl. No. 11/953,751, mailed on Nov. 16, 2009, 55 pages.
Notice of Allowance for U.S. Appl. No. 10/139,912, mailed on Oct. 19, 2009, 17 pages.
Notice of Allowance for U.S. Appl. No. 11/828,246, mailed on Nov. 16, 2009, 20 pages.
Final Office Action for U.S. Appl. No. 11/611,067, mailed on Oct. 16, 2009, 35 pages.
U.S. Appl. No. 12/639,762, filed Dec. 16, 2009, Singh.
U.S. Appl. No. 12/639,749, filed Dec. 16, 2009, Singh.
U.S. Appl. No. 12/624,300, filed Nov. 23, 2009, Davis et al.
U.S. Appl. No. 12/608,985, filed Oct. 29, 2009, Wong.
U.S. Appl. No. 12/608,972, filed Oct. 29, 2009, Wong.

Final Office Action for U.S. Appl. No. 11/831,950, mailed on Jan. 6, 2010, 21 pages.
Non-Final Office Action for U.S. Appl. No. 11/953,743, mailed on Nov. 23, 2009, 47 pages.
Non-Final Office Action for U.S. Appl. No. 11/953,745, mailed on Nov. 24, 2009, 48 pages.
Non-Final Office Action for U.S. Appl. No. 11/854,486, mailed on Jan. 12, 2010, 23 pages.
Notice of Allowance for U.S. Appl. No. 10/139,912, mailed on Nov. 23, 2009, 4 pages.
Final Office Action for U.S. Appl. No. 11/745,008, mailed on Dec. 30, 2009, 27 pages.
Final Office Action for U.S. Appl. No. 11/621,038, mailed on Dec. 23, 2009, 27 pages.
Non-Final Office Action for U.S. Appl. No. 12/198,697, mailed on Feb. 2, 2010, 50 pages.
Final Office Action for U.S. Appl. No. 10/140,749, mailed Jan. 13, 2010, 44 pages.
Non-Final Office Action for U.S. Appl. No. 11/611,067, mailed on Dec. 8, 2009, 11 pages.
Final Office Action for U.S. Appl. No. 11/615,769, mailed on Jan. 22, 2010, 34 pages.
Non-Final Office Action for U.S. Appl. No. 12/400,594, mailed on May 14, 2010, 53 pages.
Advisory Action for U.S. Appl. No. 11/615,769, mailed on May 25, 2010, 3 pages.
Advisory Action for U.S. Appl. No. 11/831,950, mailed on Mar. 4, 2010, 4 pages.
Non-Final Office Action for U.S. Appl. No. 11/779,714, mailed on Mar. 31, 2010, 26 pages.
Non-Final Office Action for U.S. Appl. No. 10/810,208, mailed on Feb. 5, 2010, 13 pages.
Final Office Action for U.S. Appl. No. 10/140,751, mailed on Mar. 25, 2010, 29 pages.
Advisory Action for U.S. Appl. No. 11/745,008, mailed on Apr. 21, 2010, 8 pages.
Notice of Allowance for U.S. Appl. No. 11/621,038, mailed on Apr. 28, 2010, 15 pages.
Non-Final Office Action for U.S. Appl. No. 12/372,390, mailed on Apr. 22, 2010, 46 pages.
U.S. Appl. No. 12/795,492, filed Jun. 7, 2010, Davis et al.
U.S. Appl. No. 12/702,031, filed Feb. 8, 2010, Davis.
U.S. Appl. No. 12/466,277, filed May. 14, 2009, Lin.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
Non-Final Office Action for U.S. Appl. No. 11/953,745, mailed on Jun. 14, 2010, 19 pages.
Final Office Action for U.S. App. No. 11/953,751, mailed on Jun. 25, 2010, 24 pages.
Notice of Allowance for U.S. Appl. No. 10/810,208, mailed on Jul. 15, 2010, 15 pages.
Notice of Allowance for U.S. Appl. No. 11/854,486, mailed on Jul. 13, 2010, 12 pages.
Final Office Action for U.S. Appl. No. 12/198,697, mailed on Aug. 2, 2010, 55 pages.
Non-Final Office Action for U.S. Appl. No. 12/639,762, mailed on Sep. 1, 2010, 40 pages.
Non-Final Office for U.S. Appl. No. 12/400,645, mailed on Sep. 1, 2010, 45 pages.
Non-Final Office Action for U.S. Appl. No. 12/372,390, mailed on Sep. 13, 2010, 10 pages.
Non-Final Office Action for U.S. Appl. No. 12/070,893, mailed on Jun. 10, 2010, 44 pages.
Notice of Allowance for U.S. Appl. No. 11/615,769, mailed on Jul. 12, 2010, 14 pages.
U.S. Appl. No. 12/198,710, filed Aug. 26, 2008, Zhang et al.
Non-Final Office Action for U.S. Appl. No. 11/646,845, mailed on Oct. 4, 2010, 48 pages.
Non-Final Office Action for U.S. Appl. No. 12/198,697, mailed on Oct. 25, 2010, 36 pages.
Non-Final Office Action for U.S. Appl. No. 12/198,710, mailed on Sep. 28, 2010, 15 pages.
Final Office Action for U.S. Appl. No. 12/400,594, mailed on Oct. 28, 2010, 13 pages.
Non-Final Office Action for U.S. Appl. No. 12/505,390, mailed on Oct. 28, 2010, 51 pages.
Non-Final Office Action for U.S. Appl. No. 11/953,742, mailed on Mar. 30, 2011, 23 pages.
Non-Final Office Action for U.S. Appl. No. 11/953,751, mailed on Mar. 29, 2011, 29 pages.
Non-Final Office Action for U.S. Appl. No. 11/779,778, mailed on Feb. 2, 2011, 63 pages.
Non-Final Office Action for U.S. Appl. No. 12/795,492, mailed on Mar. 17, 2011, 51 pages.
Non-Final Office Action for U.S. Appl. No. 12/198,710, mailed on Mar. 24, 2011, 40 pages.
Notice of Allowance for U.S. Appl. No. 12/639,749, mailed on Feb. 11, 2011, 51 pages.
Notice of Allowance for U.S. Appl. No. 12/639,762, mailed on Mar. 4, 2011, 7 pages.
Notice of Allowance for U.S. Appl. No. 12/400,594, mailed on Mar. 23, 2011, 11 pages.
Notice of Allowance for U.S. Appl. No. 12/372,390, mailed on Mar. 9, 2011, 8 pages.
Non-Final Office Action for U.S. Appl. No. 12/070,893, mailed on Mar. 18, 2011, 7 pages.
Final Office Action for U.S. Appl. No. 11/779,714, mailed on Nov. 9, 2010, 24 pages.
Non-Final Office Action for U.S. Appl. No. 10/140,751, mailed Dec. 20, 2010, 23 pages.
Requirement for Restriction/Election for U.S. Appl. No. 12/639,749, mailed on Dec. 7, 2010, 3 pages.
Notice of Allowance for U.S. Appl. No. 12/400,645, mailed on Jan. 26, 2011, 14 pages.
Final Office Action for U.S. Appl. No. 12/070,893, mailed on Nov. 24, 2010, 11 pages.
10 Gigabit Ethernet —Technology Overview White Paper, Sep. 2001, 16 pages.
10 Gigabit Ethernet Alliance, Interconnection with Wide Area Networks, Version 1.0, Mar. 2002, 5 pages.
Degermark, M., et al., "Small Forwarding Tables for Fast Routing Lookups," ACM Computer Communications Review 27(4):Oct. 3-14, 1997.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "BigIron Architecture Technical Brief," Dec. 1998—Version 1.03, 14 pages.
Foundry Networks, "BigIron Architecture Technical Brief," May 1999—Version 2.0, 15 pages.
Foundry Networks, "BigIron Architecture Technical Brief," May, 1999—Version 2.01, 15 pages.
Foundry Networks, "BigIron Architecture Technical Brief," Jul. 2001—Version 2.02, 16 pages.
Foundry Networks, "JetCore™ Based Chassis Systems—An Architecture Brief on NetIron, BigIron, and FastIron Systems," Jan. 17, 2003.
Foundry Networks, Foundry Networks, "Next Generation Terabit System Architecture—The High Performance Revolution for 10 Gigabit Networks," Nov. 17, 2003.
Gigabit Ethernet Alliance—"Accelerating the Standard for Speed," Copyright 1998, 10 pages.
Kichorowsky, R., et al., "Mindspeed.TM. Switch Fabric Offers the Most Comprehensive Solution for Multi-Protocol Networking Equipment," Apr. 30, 2001, 3 pages.
Matsumoto, C., et al., "Switch Fabrics Touted At Interconnects Conference," Aug. 21, 2000, URL=http://www.eetimes.com/story/OEG20000821S0011, accessed Aug. 12, 2002, 2 pages.
McAuley, A., et al., "Fast Routing Table Lookup Using CAMs," Proceedings of INFOCOM. Mar.-Apr. 1993, pp. 1382-1391.

Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.

Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.

Mindspeed—A Conexant Business, "Switch Fabric Chipset—CX27300 iScale.TM.," Apr. 30, 2001, 2 pages.

Mindspeed—A Conexant Business, "17×17 3.2 Gbps Crosspoint Switch with Input Equalization—M21110," Feb. 1, 2001, 2 pages.

The Tolly Group, "Foundry Networks, Inc.—BigIron 4000, Layer 2 & Layer 3 Interoperability Evaluation," No. 199133, Oct. 1999, 4 pages.

The Tolly Group, "Foundry Networks, Inc.—BigIron 8000 Gigabit Ethernet Switching Router, Layer 2 & Layer 3 Performance Evaluation," No. 199111, May, 1999, 4 pages.

U.S. Appl. No. 09/855,038, filed May. 15, 2001, Chang et al.
U.S. Appl. No. 09/988,066, filed Nov. 16, 2001, Patel et al.
U.S. Appl. No. 10/139,831, filed May. 6, 2002, Davis.
U.S. Appl. No. 10/139,912, filed May. 6, 2002, Davis et al.
U.S. Appl. No. 10/140,749, filed May. 6, 2002, Davis et al.
U.S. Appl. No. 10/140,751, filed May 6, 2002, Davis et al.
U.S. Appl. No. 10/140,752, filed May 6, 2002, Davis.
U.S. Appl. No. 10/140,753, filed May 6, 2002, Davis et al.
U.S. Appl. No. 10/736,680, filed Dec. 17, 2003, Chang et al.

Final Office Action for U.S. Appl. No. 11/646,845, mailed on Jun. 9, 2011, 22 pages.
Non-Final Office Action for U.S. Appl. No. 11/646,845, mailed on Oct. 14, 2011, 19 pages.
Non-Final Office Action for U.S. Appl. No. 11/831,950, mailed on Aug. 26, 2011, 45 pages.
Final Office Action for U.S. Appl. No. 11/953,742, mailed on Oct. 26, 2011, 19 pages.
Notice of Allowance for U.S. Appl. No. 11/953,743, mailed on Apr. 28, 2011, 19 pages.
Notice of Allowance for U.S. Appl. No. 11/953,751, mailed on Dec. 7, 2011, 12 pages.
Supplemental Notice of Allowance for U.S. Appl. No. 11/953,751, mailed on Dec. 27, 2011, 6 pages.
Notice of Allowance for U.S. Appl. No. 11/779,778, mailed on Jul. 28, 2011, 11 pages.
Final Office Action for U.S. Appl. No. 10/140,751, mailed on Jun. 28, 2011, 23 pages.
Non-Final Office Action for U.S. Appl. No. 11/745,008, mailed on Sep. 14, 2011, 26 pages.
Non-Final Office Action for U.S. Appl. No. 12/702,031, mailed on Apr. 29, 2011, 5 pages.
Final Office Action for U.S. Appl. No. 12/795,492, mailed on Jul. 20, 2011, 11 pages.
Notice of Allowance for U.S. Appl. No. 12/795,492, mailed on Nov. 14, 2011, 10 pages.
Non-Final Office Action for U.S. Appl. No. 12/198,697, mailed on May 20, 2011, 43 pages.
Notice of Allowance for U.S. Appl. No. 12/198,697, mailed on Nov. 28, 2011, 12 pages.
Notice of Allowance for U.S. Appl. No. 12/198,697, mailed on Jan. 5, 2012, 4 pages.
Final Office Action for U.S. Appl. No. 12/198,710, mailed on Oct. 19, 2011, 58 pages.
Final Office Action for U.S. Appl. No. 12/070,893, mailed on Sep. 21, 2011, 12 pages.
Requirement for Restriction/Election for U.S. Appl. No. 12/466,277, mailed on Aug. 9, 2011, 6 pages.
Notice of Allowance for U.S. Appl. No. 12/466,277, mailed on Nov. 2, 2011, 47 pages.
Non-Final Office Action for U.S. Appl. No. 13/083,481, mailed Dec. 1, 2011, 7 pages.

* cited by examiner

FLEXIBLE METHOD FOR PROCESSING DATA PACKETS IN A NETWORK ROUTING SYSTEM FOR ENHANCED EFFICIENCY AND MONITORING CAPABILITY

CROSS REFERENCE TO RELATED APPLICATIONS

The present application is a divisional application of U.S. patent application Ser. No. 10/140,752 filed on May 6, 2002, now U.S. Pat. No. 7,468,975, issued Dec. 23, 2008, which is incorporated herein by reference.

FIELD OF THE INVENTION

The present invention relates to routing in a computer network. More particularly, the present invention relates to a system for efficiently routing and monitoring packets in a computer network.

BACKGROUND

Modern networking environments provide enormously enhanced data transmission capabilities over environments available only a few years ago. However, the demand for bandwidth is constantly increasing, as is the demand for more routing and monitoring capabilities. In order to meet this demand, network devices such as routers need to increase the number of ports serviced and the features they provide.

For example, network devices need to implement Quality of Service (QOS) features, which can provide better and more predictable network service by ensuring a dedicated bandwidth to be available, improving loss characteristics, avoiding and managing network congestion, shaping network traffic, and setting traffic priorities across the network. Currently, many QOS features are implemented using software. However, software implementation is impractical for the large bandwidth routers needed to handle the increasing amount of network traffic. Similarly, network devices need to be able to route broadcast or multicast packets and jumbo packets, and to provide network monitoring capability.

Therefore, there is a need for a large bandwidth network device that can efficiently route packets with, for example, "the Internet protocol" (IPv4) type of service (TOS) fields for QOS services. Additionally, the network device should efficiently route jumbo packets and broadcast or multicast packets (including multicast packets with different VLAN IDs). Finally, the network device should be configured to perform network monitoring without the use of additional probes.

SUMMARY

According to an embodiment of the invention, a network device such as a switch or a router provides large bandwidth as well as efficiency for data packet handling capability. The network device includes multiple input and output ports for receiving and transmitting data packets. According to an embodiment, the network device performs switching or routing of data packets for numerous auto-sensing multi-speed (10/100 megabit) Ethernet ports and very high speed (e.g., gigabit) ports. According to another embodiment, the network device performs switching or routing of data packets for multiple very high speed ports.

According to one embodiment, the network device provides a port controller integrated circuit for switching or routing packets. The integrated circuit includes a packet input circuit for receiving data packets from at least one of the input ports, and a buffer manager circuit for receiving data packets from the packet input circuitry, transmitting data packets to one or more buffers, and reading data packets from the one or more buffers. The integrated circuit also includes a rate shaper counter for storing credit for a traffic class, so that the integrated circuit can support input and/or output rate shaping.

The integrated circuit may be implemented as an application specific integrated circuit (ASIC) or in a programmable logic device (e.g., an FPGA). The input ports may be 10/100 megabit Ethernet ports, gigabit Ethernet ports, Packet over SONET (POS) ports, ATM ports, or other ports. The packet input circuitry is configured to provide an interface with the appropriate port type.

The integrated circuit may be associated with one or more memories which provide a buffer pool for storing data packets. In some embodiments, the buffer pool is implemented using a random access memory (RAM). (The buffer pool is sometimes also referred to as an IRAM.) In other embodiments, other types of memory may be used. The integrated circuit may be associated with one or more content-addressable memories (CAMs) for storing information about the packets ("packet information") being handled in a memory array. The integrated circuit may include a CAM interface used to perform lookups on the CAM.

In one embodiment, the integrated circuit may be associated with an additional memory provided for storing packet parameters ("PRAM"). Each PRAM stores packet information in a memory array, including switching or routing parameters. The integrated circuit may include a PRAM interface used to perform lookups on the PRAM. The PRAM may be sized to provide values of a predetermined set of packet parameters for each CAM entry.

The integrated circuit may further include an aging RAM, which stores aging information regarding the CAM and PRAM entries. The aging information may be used by a host CPU, which may be coupled to the integrated circuit via a system interface circuit, to determine for removal entries from either the CAM, the PRAM, or both, when an age count exceeds an age limit threshold for the entries. Age counts are incremented periodically for a CAM entry, unless the entry is referenced, which resets its age count.

The integrated circuit may include a packet evaluation circuit. The packet evaluation circuit may include a port tracker circuit. The packet evaluation circuit may also include a programmable lookup processor, which may be a RISC processor. The programmable lookup processor may include a register file, a register select circuit for selecting the contents of registers as operands, an arithmetic logic unit for operating on the operands, and a feedback select circuit for providing, alternatively, as operand an output value of the ALU. In one embodiment, the register file is configured such that some of the registers are assigned to particular packet parameters, such that a snapshot of the register file provides without further processing a key for a CAM lookup. The output value of the ALU may be written into one or more of the registers.

The packet evaluation circuit may also include a CAM lookup handler for submitting lookup requests to the CAM, and a PRAM lookup handler for submitting lookup requests to the PRAM based on the values returned from a CAM lookup. The packet evaluation circuit may include packet evaluation logic circuits for performing packet processing using the results of a CAM lookup and a PRAM lookup.

The port tracker circuit may identify valid packet contexts (to filter corrupted packet data), copy a VLAN tag to a status word, and remove a VLAN tag from a packet header, in order to facilitate packet processing. The port tracker circuit may also perform TOS field lookups under the IPv4 protocol, or another suitable protocol.

The packet input circuit may include an 8B/10B decoder. Additionally, the packet input circuit may include logic circuits for CRC verification and auto-negotiation.

The integrated circuit may further include a polling logic circuit, which may perform time slot polling of the input ports of the network device. The integrated circuit may further include a received data FIFO circuit to receive data packets from the polling logic circuit. The integrated circuit may further include an internal VLAN table.

The buffer manager circuit may perform rate shaping, including input rate shaping and output rate shaping. The rate shaping may be based on port, both port and priority, or L3/L4 (network level) information. The buffer manager circuit may also be configured to route jumbo packets, which are variable-length packets for very high speed ports.

A priority may be assigned to a data packet by default, and according to whether the data packet is specified with a VLAN priority or a TOS priority. The packet priority may be further modified from the results of a CAM lookup or a PRAM lookup.

The processed data packet may be transferred to a buffer in an IRAM by the buffer manager circuit for forwarding. The buffer manager circuit may perform rate shaping. Rate shaping may be achieved by defining traffic classes, and storing credit in a counter corresponding to the traffic class. Credits are added to each counter periodically according to a credit interval. The amount of additional credit added to each counter may be different. The amount of credit is decreased when the buffer manager forwards a packet for the traffic class.

An interface adapter may be used with a port controller integrated circuit as described above, in order to interface multiple port controller integrated circuits with a backplane having multiple backplane slots. The interface adapter may provide data rate matching where the combined bandwidth of the multiple port controller integrated circuits is different from the bandwidth of the backplane. The interface adapter may transmit packets to and receive packets from any of the backplane slots and any of the port controller integrated circuits. The received data packets and the data packets to be transmitted may be stored in backplane queues. A buffer manager may be provided in the interface adapter for managing buffers used to mediate data packet traffic among the backplane and the port controller integrated circuits. A backplane RAM can be provided to provide buffers for storing data packets in transit among the backplane slots and the port controller integrated circuits.

A more complete understanding of the present invention and its advantages will be afforded to those skilled in the art upon consideration of the following detailed description of the exemplary embodiments therein. Reference will be made to the appended drawing that will first be described briefly.

BRIEF DESCRIPTION OF THE DRAWING

Use of the same or similar reference numbers in different figures indicates the same or like elements.

DETAILED DESCRIPTION

According to an embodiment of the invention, a network device includes one or more integrated port controllers, each implemented in an integrated circuit such as an application specific integrated circuit (ASIC) or a field programmable gate array (FPGA), to manage and monitor packet flow efficiently.

Network Device with Integrated Port Controller

Figure 1:
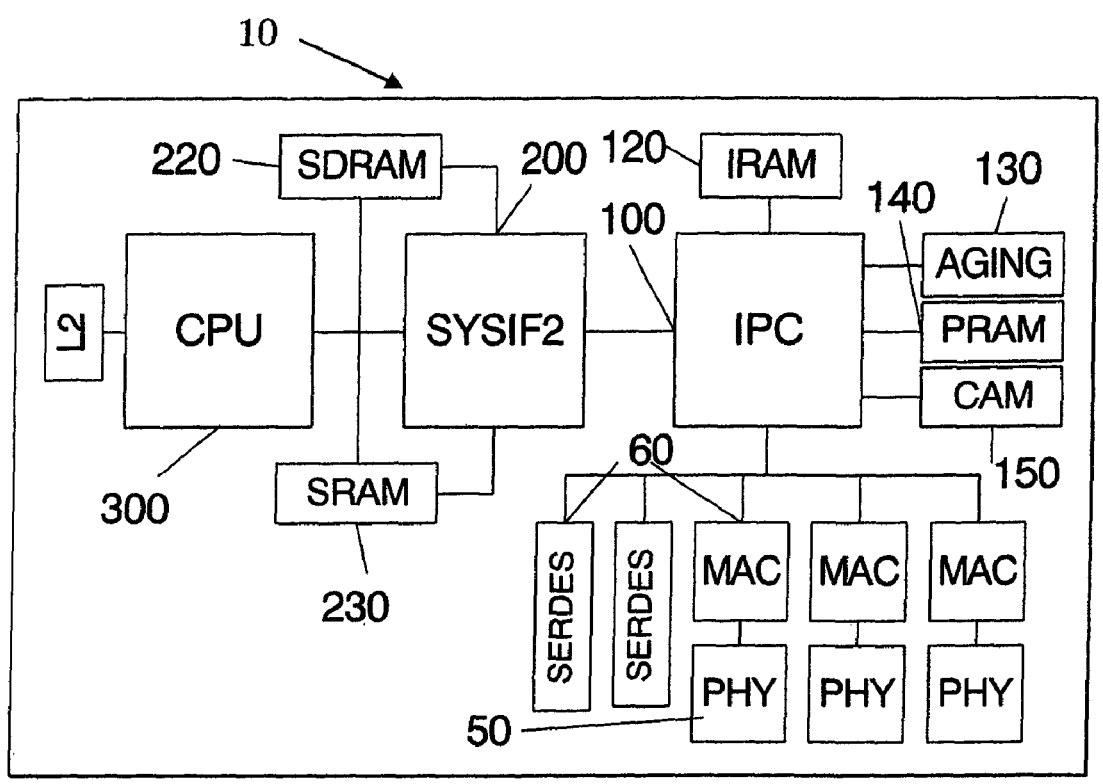
FIG. 1 is a block diagram of router 10, which includes an integrated port controller (IPC), according to an embodiment of the invention.
Figure 2:
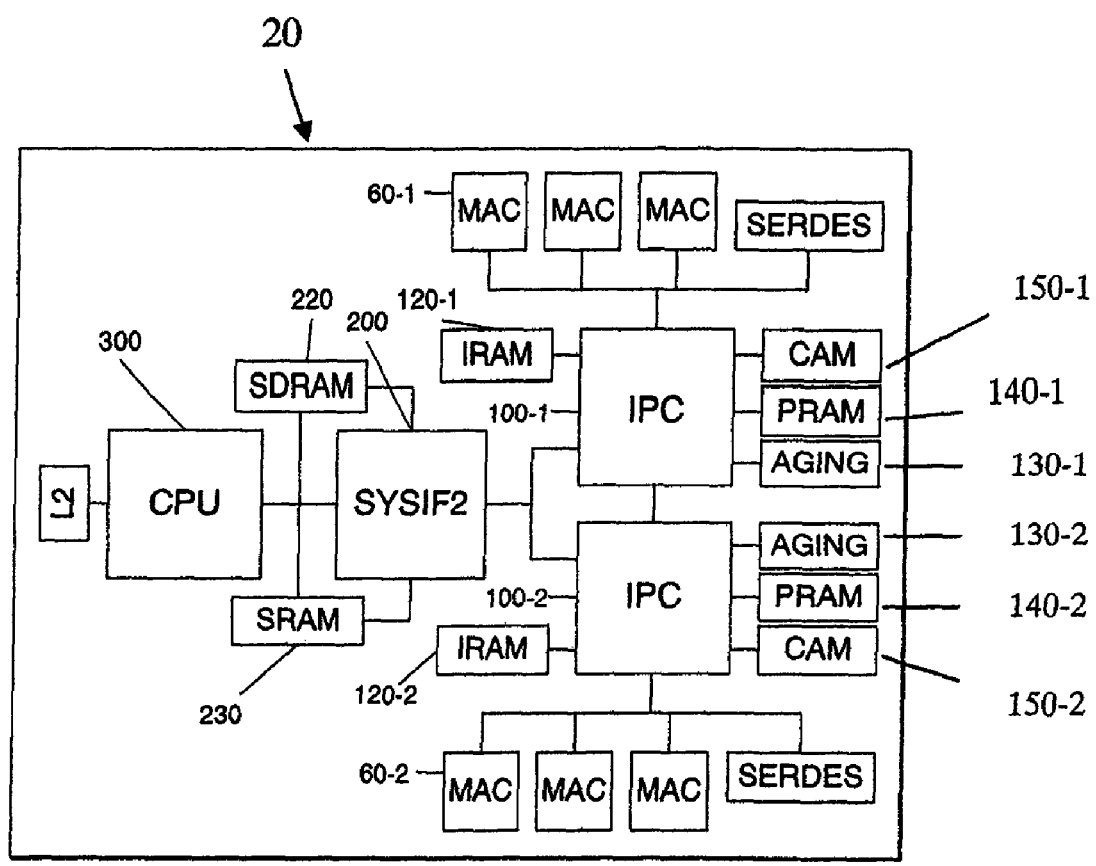
FIG. 2 is a block diagram of router 20, which includes two integrated port controllers, according to another embodiment of the invention.

In FIG. 1, a network device such as a router 10 includes an integrated port controller ASIC 100, indicated in FIGS. 1-3 by the label "IPC". Data packets are transmitted to input terminals 60 of port controller ASIC 100 via physical interfaces 50. Input terminals 60 to ASIC 100 may be provided by media access controller (MAC) circuits, for conventional 10/100 megabit Ethernet ports, or may be provided by serializer/deserializer (SERDES) circuits, for gigabit Ethernet ports. Router 10 may support other types of ports, such as POS ports, ATM ports, or other ports. According to an embodiment of the invention, ASIC 100 has twenty four 10/100 megabit Ethernet ports and two gigabit Ethernet ports. According to an alternate embodiment, ASIC 100 has four gigabit Ethernet ports. In one embodiment, each port is provided a 48-bit MAC address of which the upper 32 bits are common to all the ports, and the remainder 16 bits of the MAC address are programmable.

ASIC 100 may be associated with one or more memories, such as an integrated packet controller memory ("IRAM") 120, aging memory 130, parameter memory (PRAM) 140, and content addressable memory (CAM) 150. (Functions of these memories are explained in further detail below). IRAM 120, aging memory 130 may be implemented by random access memories. Although FIG. 1 shows ASIC 100 to be associated with one memory of each type listed above, in other embodiments more than one memory of a given type may be provided. ASIC 100 is also associated with a system interface chip 200, which in turn is associated with one or more memories such as memory 220 and 230 of FIG. 1. System interface chip 200 provides an interface between ASIC 100 and a host CPU 300.

ASIC 100 may interact with its associated memories as follows. ASIC 100 provides to CAM 150 packet information extracted from a packet received into ASIC 100, to initiate a search in CAM 150 to determine how to forward the packet to its destination and to initiate other packet processing functions. If a match is found, CAM 150 returns corresponding parameter values; in addition, or alternatively, CAM 150 returns an index into another memory array, where the corresponding data is stored. For example, in a destination address (DA) search, ASIC 100 uses the returned index to retrieve forwarding data from PRAM 140. For a source address (SA) search, ASIC 100 uses the returned index to retrieve source port information from PRAM 140, which is then used to age CAM entries.

PRAM 140 includes additional information for further processing the packet. PRAM 140 may be implemented by a 32-bit synchronous DRAM (SDRAM), sized to match CAM 150. According to an embodiment of the invention, PRAM 140 includes four separate tables implemented in different SDRAM banks. Destination address table records are in one table, source address table records are in another table, L3 (network level) records are in another table, and L4/session (network/session level) records are in another table. This banked table structure permits CAM lookups according to many supported packet types to receive different services at different levels. The associated PRAM data provide destination address/source address lookups and support network monitoring and management functions.

According to an embodiment of the invention, PRAM 140 implements address aging, which allows a CPU such as CPU 300 of FIG. 1 to remove unused entries from the CAM and PRAM memory arrays. An age bit, including an age count and an age-disable flag, is stored in a PRAM record, as well as in a separate AGERAM record on aging RAM 130. PRAM 140 also includes an aging configuration register, which may be set with an aging threshold.

When CAM 150 performs a successful address lookup (that is, locates a matching entry in the CAM array), a PRAM lookup cycle at that CAM index is performed. The information retrieved from PRAM 140 is incorporated into the 16-byte packet status word, and the age count may be zeroed, which is performed after a source address lookup in this embodiment. If the age count is zeroed, it is zeroed both in the PRAM record and the AGERAM record. The aging function is initiated by CPU 300, which commences an aging cycle by issuing an age cycle command to ASIC 100. When the age cycle command is received, an aging controller on ASIC 100 scans the AGERAM entries, incrementing the age count whenever the age-disable flag is not set, and the age value is less than an age-limit threshold in the PRAM aging configuration register. An active aging cycle is indicated in the status field of the PRAM control register. PRAM entries that age-out (the age count exceeds the age-limit threshold) have their indices stored in an aging FIFO, so that CPU 300 can take appropriate action; for example, over-writing the CAM and PRAM indices.

Figure 4:
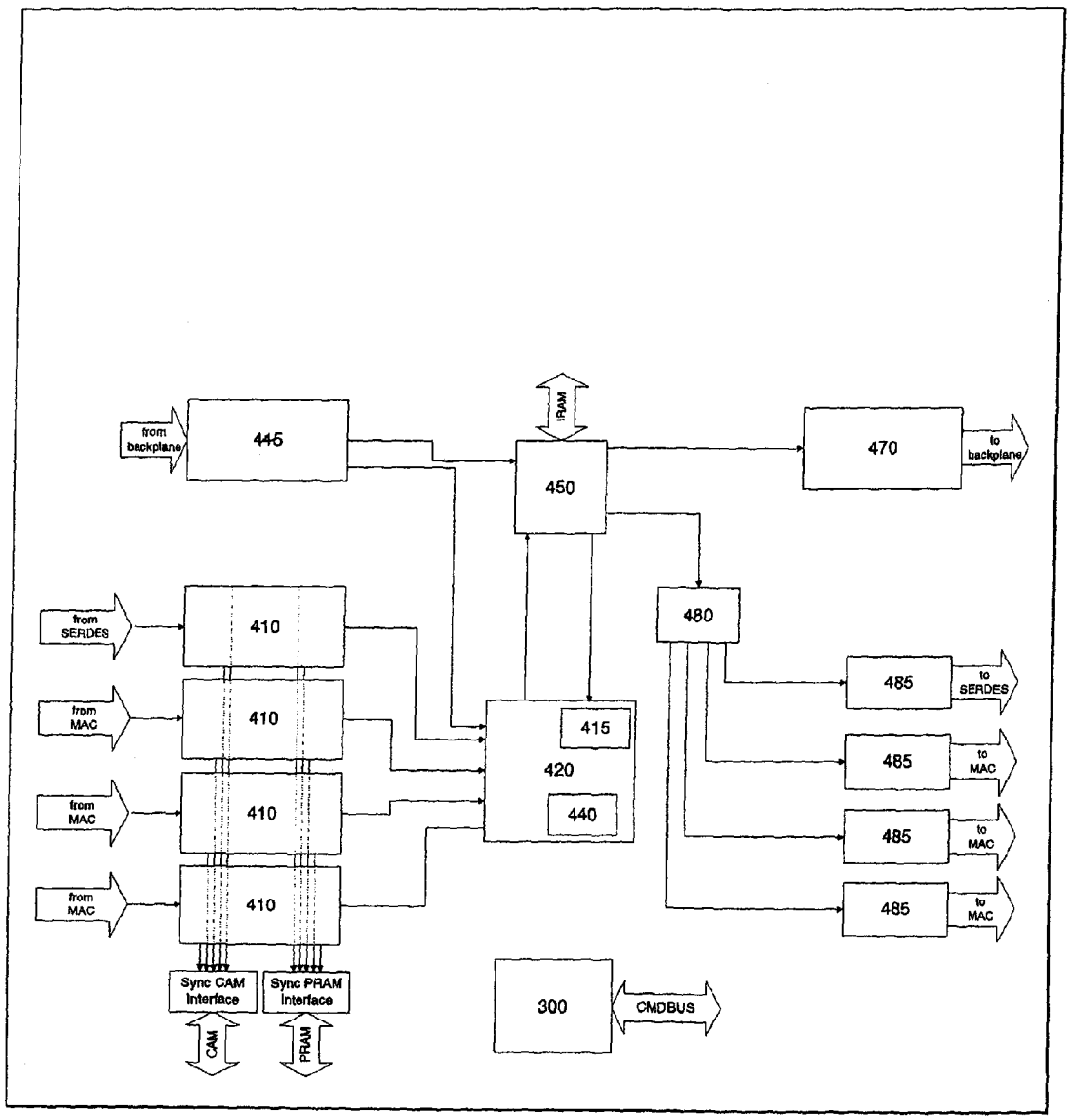
FIG. 4 is a block diagram of a port controller ASIC that may be used in a network device, such as the routers of FIGS. 1, 2, 3A, and 3B, according to an embodiment of the invention.

Once all required packet type decoding, CAM, and PRAM lookups are complete, a buffer manager controller such as buffer manager controller 440 of FIG. 4 transfers packets to one or more buffers in IRAM 120. Buffer manager controller 440 is discussed in further detail below.

FIG. 2 shows another embodiment of the present invention in router 20, which includes two port controller integrated circuits to provides support for more input ports and hence a higher traffic level than router 10 illustrated in FIG. 1. Router 20 includes port controller integrated circuits (i.e., port controller ASICs) 100-1 and 100-2. ASIC 100-1 and 100-2 are each interfaced to ports (i.e., port input terminals 60-1 and 60-2) and associated with memories (e.g., IRAM 120-1, aging ram 130-1, PRAM 140-1, and CAM 150-1 are associated with ASIC 100-1, while RAM 120-2, aging ram 130-2, PRAM 140-2, and CAM 150-2 are associated with ASIC 100-2) in the same manner as described above for ASIC 100 of FIG. 1. Router 20 also includes a system interface chip 200 which provides an interface between CPU 300 and each of ASICs 100-1 and 100-2.

Figure 3A:
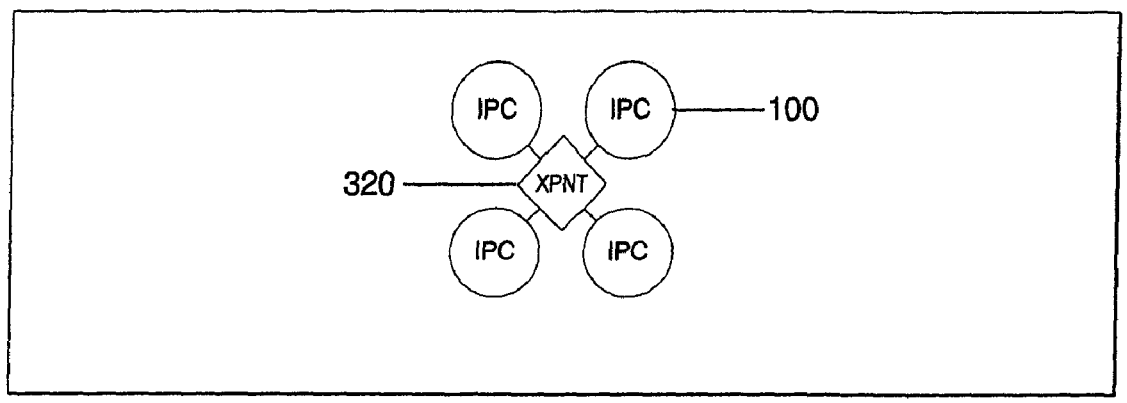
FIGS. 3A and 3B are block diagrams of two configurations in routers where multiple integrated port controllers may be connected, according to other embodiments of the invention.
Figure 3B:
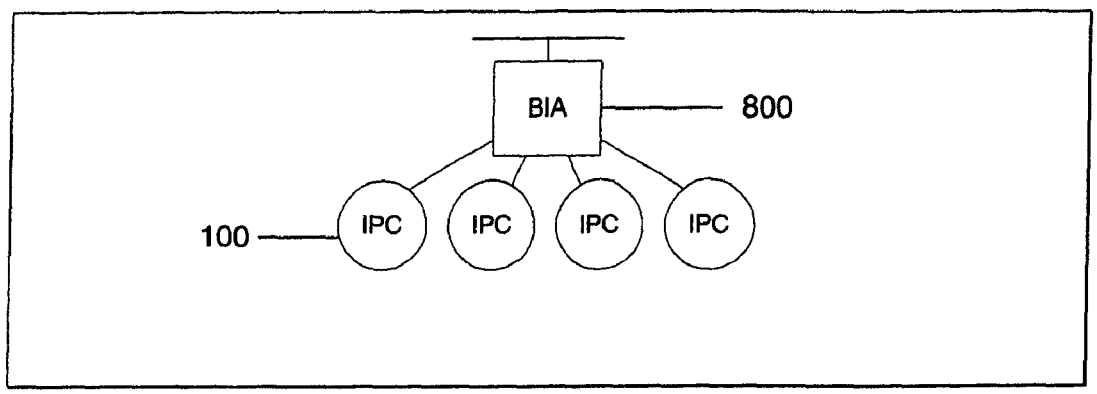

FIGS. 3A and 3B show other configurations of port controller integrated circuits for network devices capable of handling even greater packet traffic levels. FIG. 3A shows four port controller integrated circuits such as ASIC 100 of FIG. 1, coupled via a switch such as a crosspoint switch 320. FIG. 3B shows an alternate configuration, where four port controller integrated circuits such as ASIC 100 of FIG. 1 are coupled to a backplane of another router, through an interface adapter integrated circuit. The interface adapter integrated circuit may be implemented as an ASIC such as an interface adapter ASIC 800 of FIG. 3B.

FIG. 4 is a block diagram of an embodiment of a port controller integrated circuit such as ASIC 100 of FIG. 1. As shown in FIG. 4, ASIC 100 includes packet input circuit 410, which is configured to interface with gigabit ethernet media access channel (GMAC) ports and may contain an 8B/10B encoder/decoder and logic circuits for CRC verification, and auto-negotiation. In addition, packet input circuit 410 may be configured to interface with conventional 10/100 Ethernet media access controller (MAC) ports. Packet input circuit 410 may additionally receive packet transfers and perform time-slotting of transmit packet transfers. For example, packet input circuit 410 may receive packet transfers in bursts of sixteen cycles. In some embodiments, packet input circuit 410 may be configured to interface with other ports such as ATM ports or POS ports, or may be a combination of different interface types.

Besides forwarding packets to their destinations, packet input circuit 410 performs further functions. Packet input circuit 410 may be configured to perform packet classification, prepare packet modifications, and generate packet headers, which are functions that can be used to support routing at higher protocol levels, network traffic management and monitoring. Further, packet input circuit 410 prepares sixteen-byte encapsulation, which used in forwarding packets through router 10. In FIG. 4, packet input circuit 410 is implemented in separate blocks for each input port. According to other embodiments, a single block may provide input circuitry for a single input port, or for more than one input port. Input circuitry 410 may be different for different input port types, or only a sub-unit of input circuitry 410 may be different.

Figure 5:
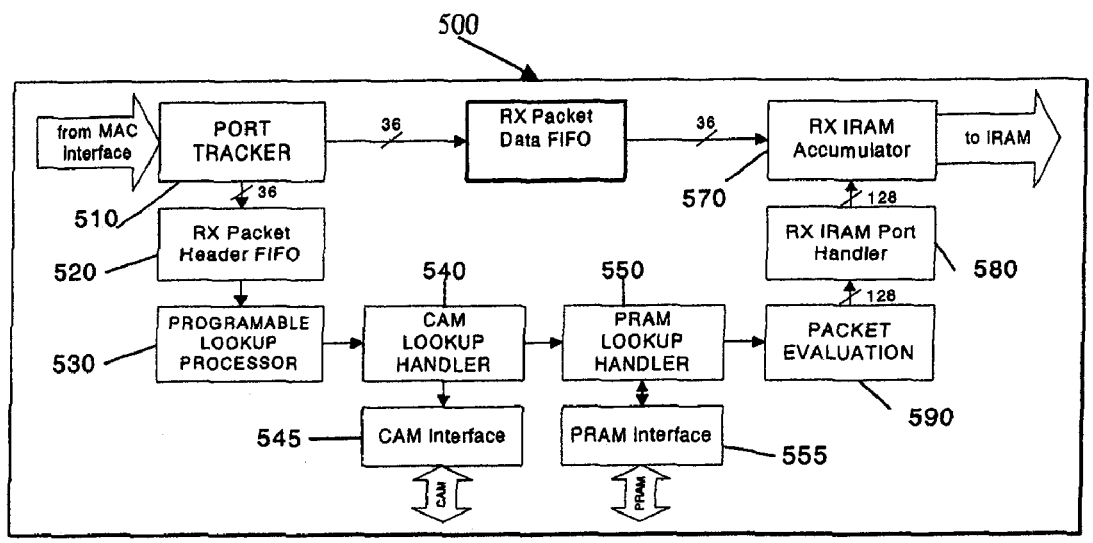
FIG. 5 is a block diagram of packet evaluation circuit 500, suitable for implementation in packet input circuit 410 shown in FIG. 4, according to an embodiment of the invention.

FIG. 5 is a block diagram of packet evaluation circuit 500, which may be included in packet input circuit 410 or elsewhere on ASIC 100. As shown in FIG. 5, a received packet is received into port tracker 510. Port tracker 510 performs "sanity" checks on the data packet received into ASIC 100 through, for example, one of the MAC interfaces, such as identifying valid packet contexts (e.g., consistent start of packet and end of packet boundaries) and examining the status word appended by the MAC, which indicates any data faults. In addition, port tracker 510 strips virtual local area network (VLAN) tags, and places a copy of the first 60 bytes of packets into header first-in-first-out (FIFO) memory 520, and a copy of the entire packet into packet data FIFO memory 560. Port tracker 510 may also perform some basic packet decoding, such as comparing the packet MAC destination address (DA) against the port MAC address, and checking the Ethernet Type field to determine whether the received packet has a VLAN tag. If DA matches the port MAC address, an internal status bit ("RX_US") is set. Based on this internal status bit, a data packet having a DA in ASIC 100 is routed to CPU 300. According to an embodiment, the VLAN ethertype field is fully programmable. When a received packet has a VLAN tag, the VLAN tag is copied from the header into a 16-byte packet status word, then removed from the packet header, so that packet processing in some portions of packet evaluation circuit 500 can proceed without regard to whether the packet is associated with a VLAN. For IPv4 type packets, port tracker 510 may also perform TOS field lookups, to enable input and output rate shaping (see below). The results of all evaluations are placed into bytes 60-63 of the packet header data.

Received packet headers are forwarded to received packet header FIFO memory 520. In an embodiment, received packet header FIFO memory 520 has a capacity of 256×36 bits. Received packet data is forwarded to a received packet data FIFO memory 560. According to an embodiment, received packet data FIFO memory 560 has a capacity of 256×36 bits.

Packet header data is forwarded from received packet header FIFO memory 520 to a programmable lookup processor (PLP) 530 for further processing. PLP 530 forms CAM lookups, creates part of the 16-byte packet header for the outgoing packet to be forwarded, and generates information needed for packet evaluation to function properly. Based on packet type (e.g., IP, IPX or L2), PLP 530 also computes a trunk index to support trunking. This trunk index is used to logically 'ORed with a MAC destination address FID.

In one embodiment, PLP 530 is a 16-bit RISC processor, able to access anything from the first 60 bytes of a packet. A program drives the specific operations of PLP 530, which directs the types of CAM lookups to be carried out, according to the packet type and values of system parameters. Some registers in the RISC processor of that embodiment are assigned to specific parameters that comprise the packet context, so that their contents can directly compose specific L2/L3/L4 CAM targets or contain packet header fields. Once processing is complete the packet context is transferred to the CAM lookup handler 540.

Figure 6:
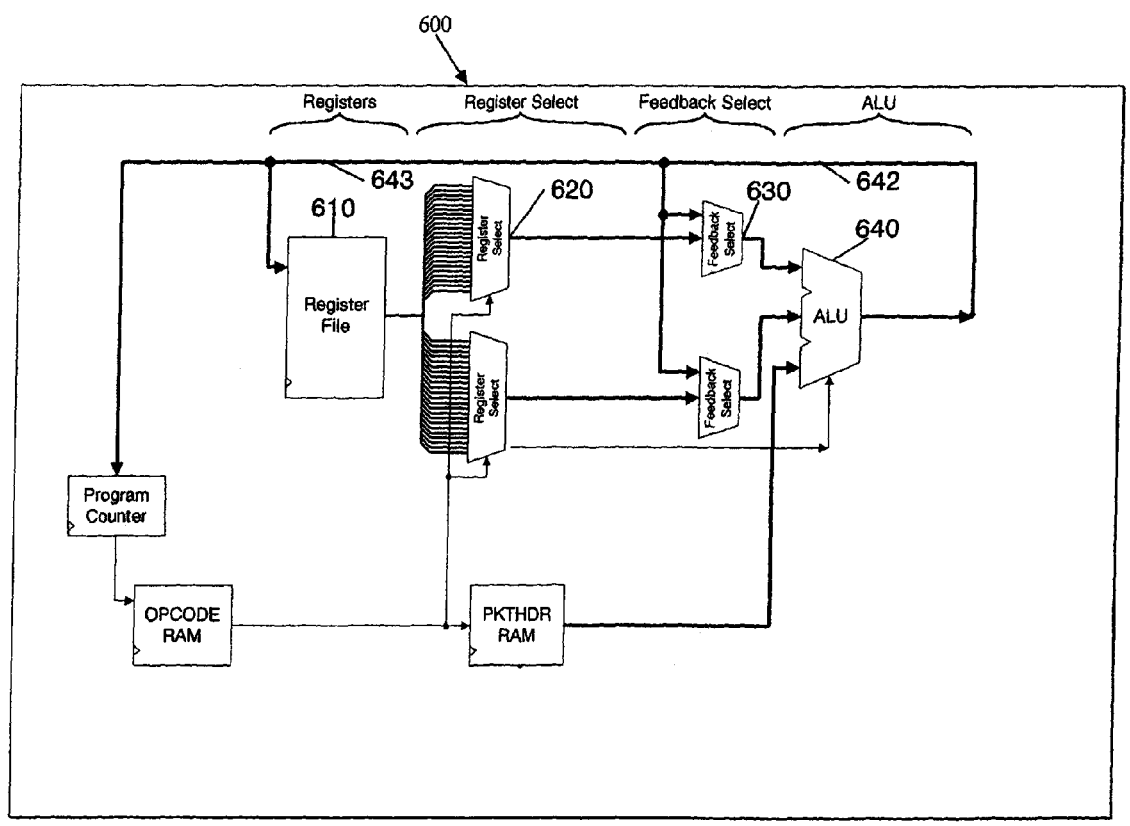
FIG. 6 is a block diagram of processor 600, which is one implementation of PLP 530 of FIG. 5, according to an embodiment of the invention.

FIG. 6 is a block diagram of processor 600, which is one implementation of PLP 530 of FIG. 5. Processor 600 includes register file 610, register select block 620, feedback select block 630, and arithmetic logic unit (ALU) 640. In an embodiment, register file 610 includes thirty one general purpose 16-bit registers and one program counter register. The registers can be freely used during evaluation to perform any operation. However, once evaluation is complete the register contents can be directly used for CAM targets and packet header information.

Register select block 620 chooses a target register's contents from register file 610 as operands into ALU 640. Feedback select block 630, which selects either the operands from the register select block 620, or an output value of ALU 640, permits back-to-back use of modified registers. In this implementation, the registers in register file 610 are pipelined such that a write operation into a register in register file 610 takes two processor clock cycles. However, if processor 600 detects that a result from ALU 640 is used in the following instruction, feedback select block 630 selects the result from ALU 640 as operand for this following instruction, rather than from register file 610. ALU 640 supports load and store operations, and arithmetic and logic binary operators including and, or, xor, neg, add, compare, inline rotate and mask operations. Constants, or immediates, can be substituted for register values in places.

Once PLP 530 completes its operation, the contents of register file 610 are transferred to CAM lookup handler 540. CAM lookup handler 540 takes a snapshot copy of all the PLP registers and submits these values to initiate one or more CAM look-up requests via CAM interface 545. With CAM lookup handler 540 controlling CAM lookup operations, PLP 530 can begin to work on another packet. When the CAM returns the lookup results, the context is transferred to a PRAM lookup handler 550.

Like CAM lookup handler 540, PRAM lookup handler 550 is also a placeholder. Specifically, PRAM lookup handler 550 maintains the packet contexts while PRAM lookups are performed. CAM handler 540 and PRAM lookup handler 550 allow a pipelined operation in the units of packet evaluation circuit 500, so that useful work (instead of stalling) is carried out while the memory accesses (e.g., such as PRAM data transfers) are performed. PRAM lookups are submitted to the PRAM via PRAM interface 555. After PRAM lookups are complete, further packet processing may be performed in packet evaluation block 590.

In most packet types, CAM lookups are carried out for the destination address and the source address. Additional lookups may be carried out for some packet types. For example, if the packet type is IPv4 or IPX, another CAM lookup (for level 3, or network layer routing information) may be done. If the packet type is IPv4, a level 4 or session lookup may also be carried out. After a successful CAM lookup, a PRAM lookup may be performed to obtain additional information used in packet forwarding. During the CAM and PRAM lookups, a number of status word flags may be set up, as an aid to software packet forwarding, hardware packet forwarding, or both. For some packet forwarding, the destination address may be replaced, or the packet header may be modified, or both in order to support hardware packet routing.

Received IRAM port handler 580 transfers data in received packet data FIFO 560 to received IRAM accumulator block 570, which is then provided to IRAM 120 (FIG. 1). In one embodiment, a separate IRAM port handler handles packets for each of ports 60. According to one embodiment, IRAM accumulator block 570 handles read data from port receive FIFOs in 32 byte chunks, applying packet modifications, and dumping data into an IRAM received FIFO. It also detects the end of packet, and builds RXDONE messages for buffer manager controller 440 of FIG. 4 (described in further detail below). If a packet is flagged as bad (for example, due to an invalid CRC), buffer manager controller 440 re-circulates the buffer directly into a freelist.

Referring again to FIG. 4, received packets are forwarded from packet input circuit 410 to packet routing circuit 420. In one embodiment, packet routing circuit 420 may includes a packet polling circuit, which performs time slot polling of the input ports for received packet data. In FIG. 4, the packet polling circuit is included in packet polling logic block 415, which is shown as part of packet routing circuit 420. In other embodiments, the packet polling logic circuit may be located differently on ASIC 100. In one embodiment, packet data is accumulated into 128 bit words and forwarded by packet routing circuit 420 to a buffer pool in IRAM 120 of FIG. 1, after all appropriate packet modifications are performed packet input circuit 410, packet evaluation circuit 500 described above, or elsewhere on ASIC 100. Packet routing circuit 420 obtains and assigns buffer numbers, specifies where to store packets, and informs buffer manager controller 440 how to forward the packet. Buffers assigned to bad or aborted packets are reused.

In one embodiment, packet routing circuit 420 implements queue management using, for example, FIFO memories. For example, a FIFO memory may be configured to store data subsequent to the packet polling logic circuit, and to provide an asynchronous boundary between received packet processing in packet routing circuit 420 and IRAM 450 of IRAM 420 (FIG. 4). Further, a FIFO memory may be used to transfer forwarding identifier (FID) and buffer number (priority and source port) information to buffer manager circuit 440 or elsewhere, to enable transmit queuing.

Buffer manager controller 440 handles transmit port queuing and rate shaping of the packet data streams. In one embodiment, buffer manager controller 440 receives RXDONE messages from port and backplane logic blocks, each indicating a complete packet evaluation. Buffer manager controller 440 extracts the packet's forwarding identifier (FID) and requests a lookup from IRAM interface 450. IRAM interface 450 may be separate from packet routing circuit 420 or may be implemented elsewhere in the switch or router. In some embodiments, buffer manager controller 440 is configured to perform source port suppression or to merge CPU and monitor masks. Buffer manager controller 440 may then add packets to individual port queues at, for example, 22 milion packets per second (Mpps). In some embodiments, buffer manager controller 440 also directs port transmit activity. For example, buffer manager controller 440 may explicitly informs IRAM interface 450 to send packets in a particular buffer pool data to particular ports, such as ports 485 of FIG. 4, or backplane slots, such as slots 470 of FIG. 4. Once packets are fully dispatched, the buffers are returned to the packet freelist.

In some embodiments, buffer manager controller 440 may support input rate shaping. Input rate shaping allows for a large number of different traffic classes to be defined and independently controlled based on programmable bandwidth limits. For example, Table 1 shows three modes of operation for an embodiment incorporating input rate shaping.

TABLE 1

| Mode | Description |
| --- | --- |
| Port based | Port based is the most basic form of input rate shaping. In this mode, each port's receive data is mapped to a traffic class, and each port's class can be independently controlled |
| Port and priority based | Port and priority based input rate shaping uses both the source port number and the packet priority to create a traffic class. In an embodiment, each port can have up to four traffic classes within it, and each can be independently controlled. |
| L3/L4 info based | L3/L4 info based input rate shaping uses a field in the PRAM (TOS replacement field) to allow software to define traffic classes based on packet IP/IPX addresses. Because the TOS field is used, this operation is only allowed in Layer 3 and Layer 4 modes of operation, and the TOS replacement cannot be used when using this mode. |

A number of parameters I, V, C, B and T are used to configure and control the input rate shaping for each class. Interval time I is the amount of time between the adding of credits for each traffic (rate shape) class. According to one embodiment of the invention, a single interval time applies to all traffic classes. In that embodiment, the selected interval period spans the entire range of traffic patterns to shape. In one embodiment, a maximum value of the interval time may be 19.66 ms, while a minimum value, which may be a default, may be chosen as 19.2 µs. Credit value V equals to the number of bytes each credit represents. According to one embodiment of the invention, a single credit value applies to all traffic classes and may have values ranging from 32 to 256 bytes per credit, in powers of 2. Credit per interval C is the amount of credit to give at the end of each interval time. Credit per interval C may be programmed to be different for each traffic class. Credits may be added to a class in two ways: fixed mode, where the programmed credit is stored in a rate shaper counter which is decremented as packets arrive, or accumulate mode, where the programmed credit is added to any credit that was left over from the previous interval. According to an embodiment of the invention, credit per interval C may range from 0 to 4096 in powers of 2. Maximum burst B sets the maximum number of credits that can be accumulated for a port operating in the accumulate mode described above. In effect, it sets a maximum burst value when a port goes from idle to sending packets. According to one embodiment of the invention, the maximum burst may be programmed individually for each traffic class and may range from 0 to 4096 in powers of 2. Credit total T is a counter per port which keeps track of the current amount of credit the port has for packets to pass and, in one embodiment, may range from 0 to 4096 in powers of 2.

According to an embodiment, at the end of each interval time I, the input rate shaper scans through all 128 traffic classes and either add (accumulate mode) or store (fixed mode) programmed credit C into a counter for each class. Total credit T in the counter cannot exceed maximum burst B. As packets arrive for a given class, the input rate shaper divides the packet length by credit value V, deducts the quotient from total credit T in the counter for that class—if total credit T is greater than the quotient—and allows the packet to be forwarded. Otherwise, the packet is dropped and not counted.

According to some embodiments, buffer manager controller 440 may support output rate shaping in a similar fashion.

In one embodiment, IRAM interface block 450, which accepts data transfer requests from six sources and performs data transfers using a time slot driven rotation, provides access to a wide high bandwidth memory pool in IRAM 120. The six sources are, respectively, (1) a port received packet path request, where data and address are provided by a port received block; (2) a backplane received packet path request, where data and address are provided by the backplane received block; (3) a buffer manager circuitry FID lookup, where a target FID is provided by the buffer manager circuitry; (4) a buffer manager controller port transmission request, where the buffer pool address and destination backplane slot are provided by the buffer manager circuitry; (5) a CPU read, where the buffer pool address is provided by a command bus interface, and (6) a CPU write request, where the data and address are provided by a command bus interface. CPU operations over a command bus interface may be pipelined.

Backplane receive interface circuitry 445 receives packets from the backplane and routes them to IRAM interface 450 and packet routing circuit 420.

The processing of transmit packets is simpler than that of received packets, since there are no CAM or PRAM lookups to perform. According to an embodiment of the invention, transmit packet processing circuit 480 of FIG. 4 requests data from buffer manager controller 440 when sufficient space is available in the transmit FIFO for a given port. When a packet is available, the integrated packet controller transfers a block of data from IRAM 120 of FIG. 1. The contents of the packet status word direct operation of the transmit logic circuit. Transmit packet processing circuit 480 examines the packet header of each packet to determine the packet's length, starting offset, and the type of packet processing needed. Processing depends on the status bits in the header and the port's mode of operation, and includes, for example, dynamically extending or shrinking packet data length and re-aligning data to a quad-word (i.e., 64-bit) boundary. If the packet is VLAN-tagged (see below), processing includes inserting a VLAN ID from the header into the packet (if in auto or tagged mode of operation). Other processing, such as replacing the MAC destination address in packet data with a value from the header and replacing the MAC source address in packet data with port address, are also carried out when required.

Once the packet header has been processed it is passed to transmit interface circuit 485. Transmit interface circuit 485 may be a MAC interface controller for transmission to an external MAC. Packets may be transmitted to a backplane of a switch or a router via backplane transmit interface circuit 470 (FIG. 4).

VLAN Tagging Support

According to some embodiments, an integrated port controller such as ASIC 100 of FIG. 1 supports VLAN tagging. In one embodiment, a number of VLAN tagging modes are supported: (1) tagged only ports; (2) untagged only ports, (3) priority tagged only ports, (4) repeater mode auto-tagging ports (tag if necessary), (5) untagged to tagged translator mode (tagging preferred) auto-tagging ports, (6) priority-tagged to tagged translator mode (tagging preferred) auto-tagging ports; (7) and untagged to priority-tagged translator mode (priority-tagging preferred) auto-tagging ports.

Internal VLAN Table

According to some embodiments, ASIC 100 has an internal VLAN table. L2 VLAN lookups are performed from the internal table. The VLAN lookup can override, for example, the default FID, the QOS (Quality of Service) index, and enforce per-port VLAN blocking.

Packet Priority Handling

A network device such as router 10 of FIG. 1 may allow for different forwarding priorities of data packets. Packet forwarding priority within router 10 may be established in a number of ways. Packet priority may be based on packet evaluation parameters, such as those determined during CAM and PRAM lookups. Additionally, priority may be affected by VLAN tags and TOS (type of service) lookups.

Figure 7:
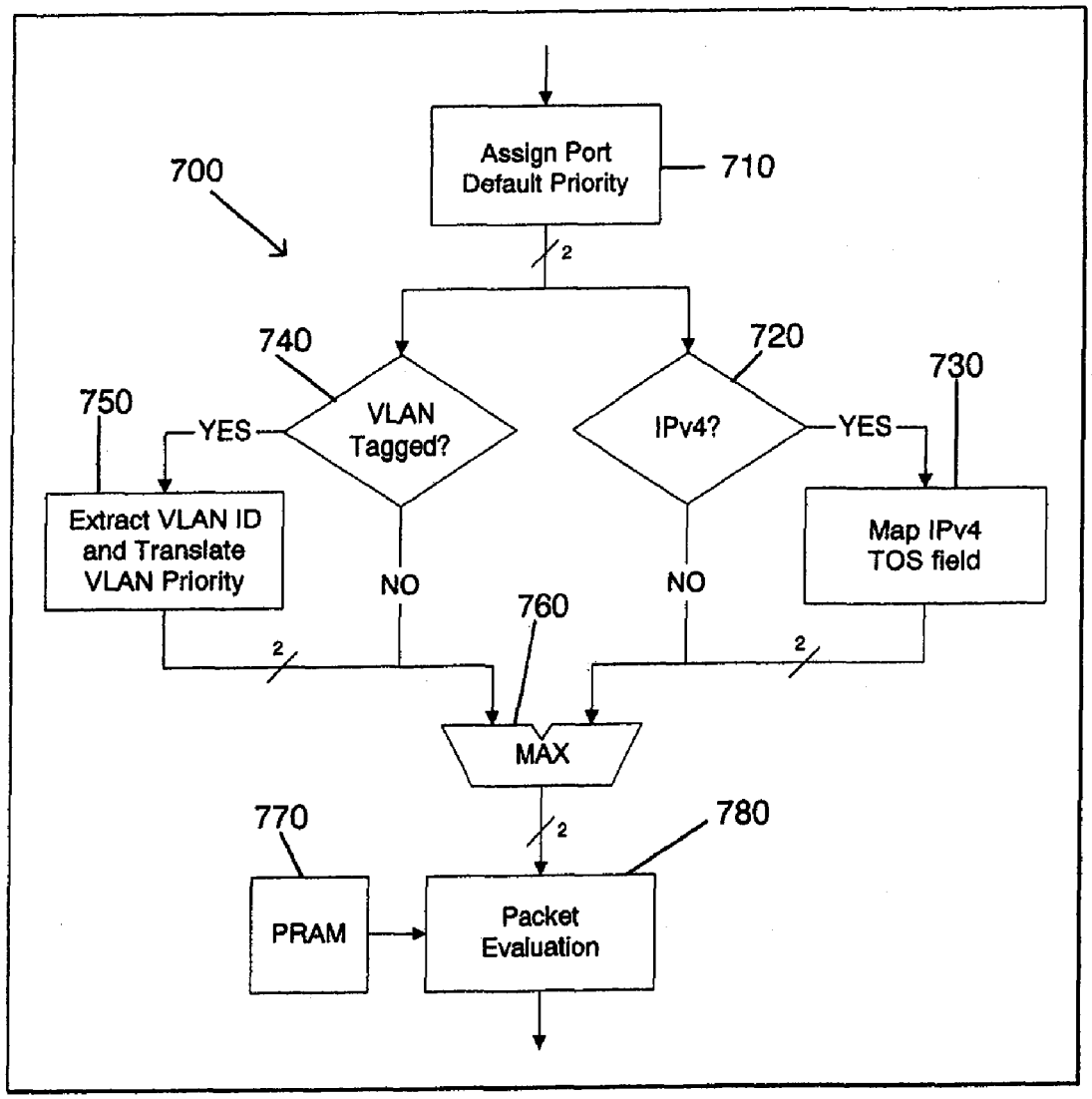
FIG. 7 shows process steps that may be performed using a router to assign a priority to a packet, according to an embodiment of the invention.

FIG. 7 shows a process 700 for assigning packet forwarding priority, according to one embodiment of the invention. In step 710, a 2-bit port default priority is assigned to a packet. In step 720, the packet's packet type modifies its packet forwarding priority. If the packet type is IPv4, the IPv4 TOS field replaces the port default priority. Alternatively, a VLAN tag also modifies the packet forwarding priority, as shown in step 740. If a packet has a VLAN tag, its VLAN ID is extracted in step 750, and a VLAN priority is translated and replaces the port default priority.

In step 760, the highest of the applicable priorities is selected. The highest priority may be the port default priority, the VLAN priority, or the priority in the TOS field.

In step 770, the PRAM produces a 3-bit merge value. In step 780, a resulting packet priority is determined from the 3-bit merge value and the 2-bit priority from step 760. Table 2 below lists the results obtained for different merge values.

TABLE 2

| Merge Value | Result |
| --- | --- |
| 000 | Max of (2-bit priority, 0) |
| 001 | Max of (2-bit priority, 1) |
| 010 | Max of (2-bit priority, 2) |
| 011 | Max of (2-bit priority, 3) |
| 100 | Force to 0 |
| 101 | Force to 1 |
| 110 | Force to 2 |
| 111 | Force to 3 |

Jumbo Packet Support

According to an embodiment of the invention, a network device such as router 10 of FIG. 1 may support jumbo packet sizes. To route jumbo packets, a buffer size (e.g., up to 15 Kybtes or higher) is set in IRAM 120 to accommodate jumbo packets. Additionally, GMAC ports or back plane slots capable of sending or receiving jumbo frames are identified and enabled. Buffer manager controller 440 may be configured to enable forwarding jumbo packets to 10/100 Mbit Ethernet ports. Additionally, buffer manager controller 440 may be configured to copy a jumbo packet to the CPU if a destination is dropped because it cannot handle jumbo frames.

Multicast Packet Support

A network device such as router 10 of FIG. 1 may also support broadcast or multicast packets (i.e, a received packet is replicated multiple times and transmitted to designated ports). Multicast packets may be transmitted with different VLAN IDs. By setting a flag in the packet header, buffer manager controller 440 recognizes the packet as a multicast packet with VLAN replication enabled. The VLAN ID in the packet header is then treated as a multicast VLAN identifier (MID), enabling packet replication with the correct VLAN ID. In one embodiment, the MID and a transmit port number are used to compute an index into a "multicast start offset table" to obtain a replication count for the transmit port. In this manner, the multicast can be treated differently for each port. The count for each transmit port is used to index into a multicast replacement table. As the count is incremented for each replication, the count points to a different replacement table record in the multicast replacement table. The replacement record provides the VLAN ID to use, the VLAN priority to use and other special instructions for processing the replication.

Trunking Support

In addition to the FID adjustment based on packet address and packet type, FID adjustment to support trunking can also be based on the physical port number. In one embodiment, selected bits (e.g., bits [4:1]) of the physical port number can be used to modify the FID by an logical 'OR. Alternatively, masked source port suppression on a per-port basis allows portions of the port number to be ignored during segment filtering. Packets arriving from any of the trunked ports segment filters to the same destination.

Statistical Packet Sampling

A network device such as router 10 of FIG. 1 may be configured to perform statistical packet sampling to monitor and analyze network traffic. A commonly assigned U.S. patent application Ser. No. 10/107,749 entitled "Network Monitoring Using Statistical Packet Sampling," Sunil P. Chitnis, Ian E. Davis, Jordi Moncada-Elias, Satyanarayana M. Sama, filed on Mar. 26, 2002, which is hereby incorporated by reference in its entirety, describes statistical packet sampling in a network device such as router 10.

Interface Adapter

Figure 8:
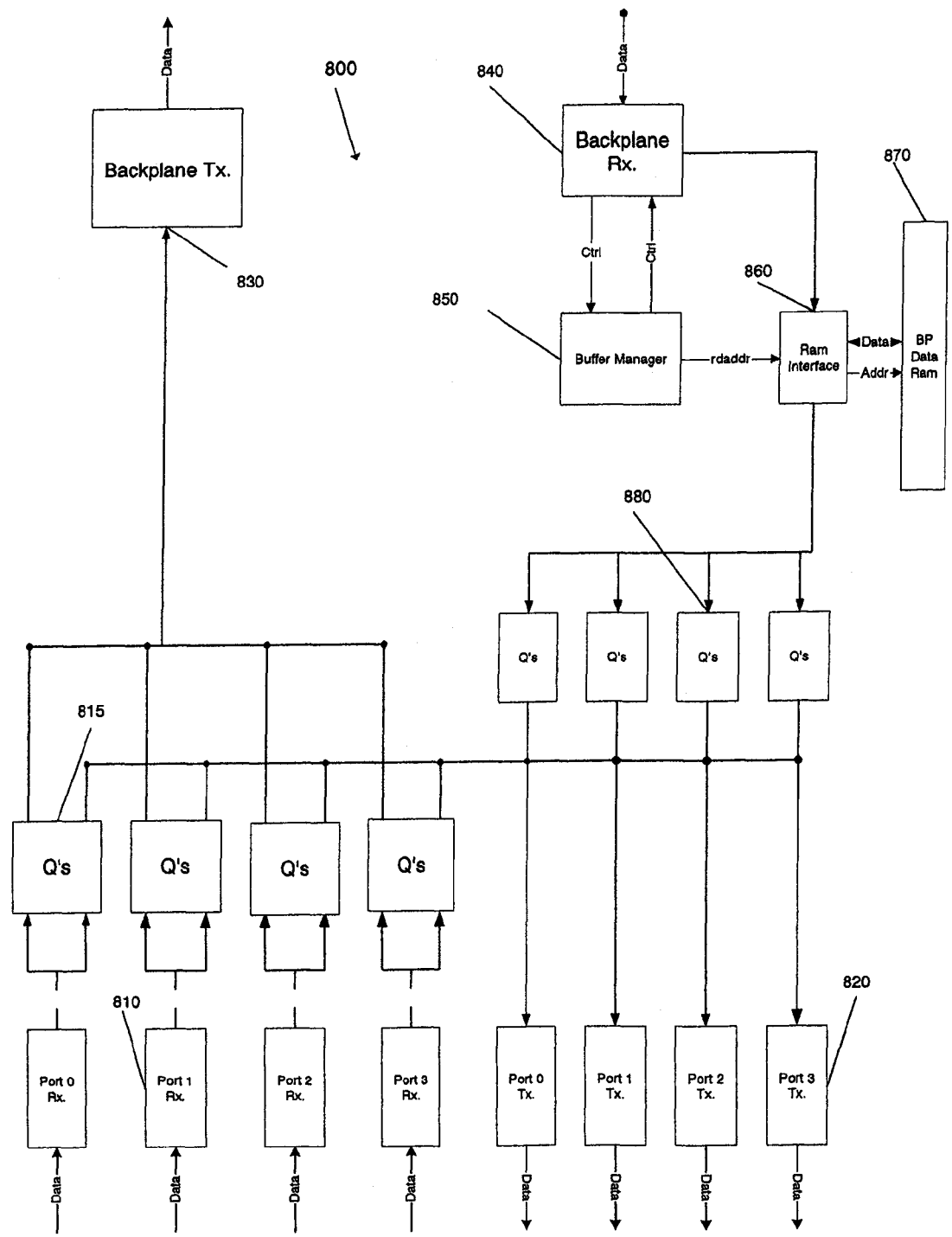
FIG. 8 is a block diagram of interface adapter ASIC 800 that may be used in a router such as that shown in FIG. 3B, according to an embodiment of the invention.

According to some embodiments, an integrated port controller such as ASIC 100 described above may be used with an interface adapter (IA), which is implemented in an integrated circuit such as an ASIC 800 shown in FIG. 8. ASIC 800 may provide an interface between one or more integrated port controllers and a backplane, as shown in FIG. 3B. For example, ASIC 800 may provide an interface between four integrated port controllers and seven backplane slots.

An interface adapter such as ASIC 800 may be used to transmit data when more than one integrated port controller such as ASIC 100 of FIG. 1 is configured to route data to and from a backplane on a network device such as router 10. The interface adapter can manage bandwidth difference between multiple port controllers such as ASIC 100 and the backplane of the network device. By providing an interface adapter such as ASIC 800, a higher density per line card may be achieved.

Integrated Port Controller Receive Interface Block

An integrated port controller receive interface block 810 interfaces with an integrated port controller such as ASIC 100 of FIG. 4. According to an embodiment, block 810 receives data from an integrated port controller on a 32-bit data bus. Block 810 also receives a 3-bit header, and a destination port number. The destination port number specifies which of the ports or backplane slot the 32-bit data should be sent. Data packets received in block 810 can be transmitted to one or more backplane queues 815. Backplane queues 815 transmit data packets to a backplane transfer interface block 830.

Integrated Port Controller Transmit Interface Block

Similarly, an integrated port controller transmit interface block 820 interfaces with an integrated port controller such as ASIC 100 of FIG. 4. According to an embodiment, block 820 transmits data to an integrated port controller using a 32-bit data bus. Block 820 also transmits a 3-bit header, and a source port number. The source port number specifies which of the ports or backplane slot the 32-bit data originated.

Backplane Transmit Interface Block

Backplane transmit interface block 830 interfaces with a backplane on a network device such as router 10 of FIG. 1. According to an embodiment, block 830 transmits data to the backplane using a 64-bit data bus. Block 830 also transmits a 6-bit header, and a 3-bit slot number that identifies the destination slot for the data.

Backplane Receive Interface Block

Similarly, a backplane receive interface block 840 interfaces with a backplane on a network device such as router 10 of FIG. 1. According to an embodiment, block 840 receives data from the backplane using a 64-bit data bus. Block 840 also receives a 6-bit header, and a 3-bit slot number that identifies the source of the data.

Buffer Manager

Interface adapter 800 includes a buffer manager 850. Buffer manager 850 manages one or more buffers, which receive incoming data from the backplane. According to an embodiment, buffer manager 850 manages buffers that are 256 bytes wide and support 512 KB of data.

Buffers are allocated using a free buffer list. According to an embodiment, the free buffer list is a 2048-entry circular queue initialized by software during a software reset initialization. Buffer manager 850 allocates a new buffer when the start of a packet is detected from any backplane slot, and when the first bytes arrive from a slot needing another buffer to accommodate the remaining portion of the packet. When a buffer is full, or an end of packet is detected, the header queues corresponding to that packet are updated, as is information in the usage buffer. According to an embodiment, the usage buffer is 2K by 4 bits, where the 4 bits each correspond to an integrated port controller that the buffer contents may be sent to. When the header queue is updated, the buffer entry in the usage buffer is updated with information from an FID RAM, indicating which integrated port controller the buffer contents will be sent to.

Buffer manager 850 controls the header queues. According to an embodiment, there are 28 header queues, each corresponding to a combination including one of seven backplane source slots and one of four integrated port controllers. Each of the 28 header queues contains 1024 entries. When a header queue fills up, buffer manager 850 sends a hold request to the corresponding backplane slot. A header queue entry is updated when a buffer fills up or when an end of packet is detected.

Backplane RAM Control Interface Block and Backplane Data RAM

According to an embodiment, a backplane RAM control interface block 860 provides an interface to a backplane data RAM 870. Data arrives from the backplane during each cycle. Backplane receive interface block 840 packs two 64-bit data blocks to form a line, which is written to backplane data RAM 870. The data, as well as an address, are sent to backplane data RAM 870. According to an embodiment, this write request is considered the highest request and the controller guarantees that the request is honored every time. A FIFO is not used between backplane receive interface block 840 and backplane RAM control interface block 860, since the write requests are always honored and never delayed or dropped. Data received from the backplane is stored in one or more backplane queues 880.

Backplane RAM control interface block 860 is also responsible for interfacing with the read queues which contain addresses from which to read data and place in queues going to integrated port controller transmit interface blocks 820. Buffer manager 850 provides source slot number and header information corresponding to the data to be read from integrated port controller transmit interface block 820 to the backplane RAM control interface block 860. Unlike write requests, read requests are arbitrated in a round-robin scheme. When no data is being sent from the backplane, all of the bandwidth is available to process read requests.

CPU Interface

Interface adapter 800 may interface with a CPU such as CPU 300 of FIG. 1 via a command bus, which may be a purely asynchronous bus.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. A method of processing a data packet received over a port, comprising:
   receiving the data packet over the port;
   deriving a forward identifier for the data packet;
   computing, after receiving the data packet, a trunk index for the received data packet based upon a type of the data packet;
   modifying the forward identifier to enable trunking, the modifying comprising performing a logical operation using the forward identifier and the trunk index; and
   performing a lookup in a memory using the modified forward identifier.

2. The method of claim 1 wherein the type is one of Internet Protocol (IP), Internetwork Packet Exchange (IPX), or Layer 2 (L2).

3. A device comprising:
   a set of ports;
   a memory; and
   a port controller configured to
      derive a forward identifier for a data packet received by the device over an input port from the set of ports,
      compute a trunk index for the data packet after receiving the data packet based on a type of the data packet, modify the forward identifier to enable trunking by performing a logical operation using the forward identifier and the trunk index, and perform a lookup in the memory using the modified forward identifier.

4. The device of claim 3 wherein the type is one of Internet Protocol (IP), Internetwork Packet Exchange (IPX), or Layer 2 (L2).

5. A method comprising:

determining, by a network device, a forwarding identifier for a packet received by the network device;

computing a trunk index for the received packet based on a type of the packet;

modifying, by the network device, the forward identifier to support trunking, the modifying comprising performing a logical operation using the forward identifier and the trunk index; and performing, by the network device, a lookup in a memory using the modified forward identifier.

6. The method of claim 5 wherein the type is one of Internet Protocol (IP), Internetwork Packet Exchange (IPX), or Layer 2 (L2).

7. A device comprising:

a memory; and a port controller configured to:

determine a forwarding identifier for a packet received by the device;

compute, based on a type of the packet, a trunk index for the received packet;

modify the forward identifier to support trunking by performing a logical operation using the forward identifier and the trunk index; and perform a lookup in the memory using the modified forward identifier.

8. The device of claim 7 wherein the type is one of Internet Protocol (IP), Internetwork Packet Exchange (IPX), or Layer 2 (L2).

* * * * *